United States Patent
Cohen

(10) Patent No.: US 6,515,666 B1
(45) Date of Patent: Feb. 4, 2003

(54) METHOD FOR CONSTRUCTING GRAPH ABSTRACTIONS

(76) Inventor: Jonathan Drew Cohen, 7806 Kawshek Path, Hanover, MD (US) 21076

( * ) Notice: Subject to any disclaimer, the term of this patent is extended or adjusted under 35 U.S.C. 154(b) by 63 days.

(21) Appl. No.: 09/682,078

(22) Filed: Jul. 17, 2001

(51) Int. Cl.$^7$ ............................................. G06T 11/40
(52) U.S. Cl. ...................................................... 345/440
(58) Field of Search ......................................... 345/440

(56) References Cited

U.S. PATENT DOCUMENTS 5,832,485 A * 11/1998 Chaudhry ..................... 707/9
6,373,484 B1 * 4/2002 Orell et al. ................. 345/440

* cited by examiner

Primary Examiner—Matthew Luu
(74) Attorney, Agent, or Firm—Stephen M. Bloor

(57) ABSTRACT

A method of constructing graph abstractions using a computer is described. The abstraction is presented on a computer display and used by a human viewer to understand a more complicated set of raw graphs. The method provides rapid generation of an abstraction that offers an arbitrary composition graph of vertices into composite vertices, dispersing and marshaling of composite vertices, arbitrary hiding and showing of portions of the composition, and marking of points of elision.

8 Claims, 18 Drawing Sheets

METHOD FOR CONSTRUCTING GRAPH ABSTRACTIONS

BACKGROUND OF INVENTION

1. Field of Invention

This invention relates to the field of graph visualization, and specifically to the field of constructing abstractions of graphs, using a computer, for the purpose of human understanding. In this context, the word graph is used in the mathematical sense, consisting of a collection of vertices joined by edges.

2. Background of the Invention

Graphs are presented to humans with the intent of conveying information. The presentation is made on a computer screen, driven by a computer, usually in an interactive environment, so that the user can control the presentation. The layout of the graph, and appearance of its elements, are chosen to portray those aspects of the graph that are thought to be of interest at the time. As the graph becomes large, clever layouts fail to be sufficient to create a picture that can be comprehended easily, and the intended information is not communicated readily, if at all.

To a small extent, this may be addressed in an interactive interface by zooming, panning, and distorting a fixed layout. In particular, fisheye views can offer some selected detail in the context of the entire graph. But these approaches, while always useful as augmentations, do not go very far towards appreciating large graphs.

A more fruitful approach is to present the human viewer with an abstraction of the graph. The abstraction is itself a graph a simplification that retains the salient features of the underlying raw graph. To be of much utility, the abstraction method must offer means of reducing the graph's complexity while still communicating the important aspects. Since the definition of important aspects varies not only with the raw graph, the project, and the human viewer, but also with the moment, the abstraction method must be versatile and rapid.

The needs for graph abstraction have been recognized for a long time, and the prior art teaches much about graph element elision and composition.

To obtain composition (grouping) of vertices, classical graphs have been augmented with an additional graph, here called a composition graph, that specifies how vertices may be grouped. The nature of this composition graph, and its interaction with the raw (classical) graph, has followed an assortment of models.

Eick and Wills (S. G. Eick and G. J. Wills, Navigating Large Networks with Hierarchies, *Proceedings of Visualization '93*, IEEE Computer Society Press, Los Alamitos, Calif., 1993, pp. 204–210) grouped vertices by defining a composition graph whose form was a forest and whose leaves were raw graph vertices. Clusters represented by internal nodes in the forest could be opened and closed to obtain abstractions. This so-called clustered graph model was used by Huang and Eades (M. L. Huang and P. Eades, A Fully Animated Interactive System for Clustering and Navigating Huge Graphs, *Graph Drawing, 6th International Symposium, GD '98*, Lecture Notes In Computer Science, No. 1547, S. H. Whitesides, ed., Springer, 1998, pp. 374–383) in their disclosure of the DA-TU system in which abstractions of a clustered graph are obtained by opening and closing clusters independently, and clusters may be hidden from the drawing; in their system, clusters are arranged in local regions and outlined by boxes.

Sugiyama and Misue, 1991 (K. Sugiyama and K. Misue, Visualization of Structural Information: Automatic Drawing of Compound Digraphs, *IEEE Transactions on Systems, Man, and Cybernetics*, Vol. 21, No. 4, July/August 1991, pp. 876–892) suggested using a more general model than clustered graphs. Their compound graphs employ a composition graph that is still a tree, but whose vertices may all be raw graph vertices. In other words, edges representing both adjacency and inclusion are permitted. Each cluster may be open or closed. When a cluster is closed, its contents do not appear; when open, its contents are drawn in a convex region.

It is common practice in graph visualization programs to permit the ad hoc condensation of collections of vertices and permit hiding of vertices. Representative systems are disclosed by Kimelman et al. (D. Kimelman, B. Leban, T. Roth, and D. Zernik, Reduction of Visual Complexity in Dynamic Graphs, Graph Drawing, DIMACS International Workshop, GD '94, Lecture Notes In Computer Science, No. 894, R. Tamassia and I. G. Tollis, eds, Springer, 1995, pp. 218–225), Frolich and Werner (M. Frolich and M. Werner, Demonstration of the Interactive Graph Visualization System da Vinci, Graph Drawing, DIMACS International Workshop, GD '94, Lecture Notes In Computer Science, No. 894, R. Tamassia and I. G. Tollis, eds, Springer, 1995, pp. 266–269), Sander (G. Sander, Graph Layout Through the VCG Tool, Graph Drawing, DIMACS International Workshop, GD '94, Lecture Notes In Computer Science, No. 894, R. Tamassia and I. G. Tollis, eds, Springer, 1995, pp. 194–205), Benz (H. Benz, KGB: A Customizable Graph Browser, Graph Drawing, Symposium on Graph Drawing, GD '95, Lecture Notes In Computer Science, No. 1027, F. J. Brandenburg, ed., Springer, 1996, pp. 20–23), Sugiyama and Misue, 1996 (K. Sugiyama and K. Misue, A Generic Compound Graph Visualizer/Manipulator: D-ABDUCTOR, Graph Drawing, Symposium on Graph Drawing, GD '95, Lecture Notes In Computer Science, No. 1027, F. J. Brandenburg, ed., Springer, 1996, pp. 500–503), Huang and Eades (1998), and Carmignani et al. (A. Carmignani, G. DiBattista, W. Didimo, F. Matera, and M. Pizzonia, Visualization of the Autonomous Systems Interconnections with Hermes, Graph Drawing, 8th International Symposium, GD 2000, Lecture Notes In Computer Science, No. 1984, J. Marks, ed., Springer, 2001, pp. 150–163).

Herman et al. (I. Herman, G. Melan ç on, and M. S. Marshall, Graph Visualization and Navigation in Information Visualization: A Survey, *IEEE Transactions on Visualization and Computer Graphics*, Vol. 6, No. 1, January–March 2000, pp. 24–43) offer an overview of the work in graph visualization.

Despite the considerable work reported in this area, the prior art fails to address many graph abstraction needs.

To begin, many of the systems assume special structure to the raw graph, and do not consider the possibility of multiple raw graphs contributing to the abstraction. In practice, raw graphs have arbitrary structure that must be accommodated, including the possibilities that the raw graphs may contain loops and that each pair of adjacent vertices may be joined by perhaps thousands of edges, as might result by representing state transitions, transactional information, or multifaceted relationships between vertices. Rendering all of such edges in a drawing is likely to be distracting; performing analysis on such graphs may also be expensive if all edges need to be traversed repeatedly. In some cases, multiple edges between a pair of vertices should be retained, but abstractions disclosed in the prior art do not teach the handling of such a situation.

As mentioned above, it is desirable to collect groups of vertices and represent each by a composite vertex. Composite vertices can, in turn, also contain other composites. The optimum directed graph that represents this vertex composition, the composition graph, may not necessarily form a tree: raw graph vertices can be present in more than one group, as can composite vertices. Such situations would arise when describing multiple inheritance for class design, or subsystems that appear in multiple places (and perhaps multiple levels) in hardware design. In general, the graph showing the relation between composite vertices and raw graph vertices is an arbitrary directed acyclic graph. Yet no disclosure of a system employing a composition graph other than a forest is offered by the prior art, and such a generalization would not be accommodated in existing systems in an obvious way.

The prior art offers no abstraction methods in which one can surface a portion of a closed composite vertex's content, or suppress the effects of a portion of a closed composite vertex.

The removal of edges or vertices from abstractions can lead to a deceptive picture if the viewer is not kept aware of such hiding, yet the prior art does not teach methods for doing this.

SUMMARY OF INVENTION

In consideration of the problems detailed above and the limitations enumerated in the partial solutions thereto, an object of my invention is to provide a method that will construct graph abstractions on a computer for human presentation.

Another object of my inventions is to accommodate an arbitrary directed acyclic graph as a composition graph.

Another object of my invention is to accommodate raw graphs of arbitrary nature, including loops and multiple edges between each pair of vertices.

A further object of my invention is to provide abstraction combining multiple raw graphs.

A still further object of my invention is to permit the exposure of arbitrary contents of closed composite vertices.

Another object of my invention is to permit the hiding of the effects of arbitrary contents of closed composite vertices.

Yet another object of my invention is to construct a graph abstraction rapidly for interactive use.

In order to attain the objectives described above, according to an aspect of my invention, there is provided a method for constructing graph abstractions, the steps of which are summarized below.

My invention may be thought to comprise two stages. In the first stage, constituent raw graphs are combined to produce a base graph. At this time, raw graphs are combined, and the many edges in the raw graphs are represented by (usually fewer) composite edges in the base graph. In the second stage, the base graph is reduced to an abstraction graph, in accordance with vertex composition, dispersion state of composite vertices, visibility of vertices and edges, and other choices by the viewer.

There are at least two purposes for factoring the problem in this manner. The first stage performs operations whose settings will likely not change frequently, the latter stage carries out directives that, in practice, will likely change as the human viewer peruses the raw graphs, moving through a family of abstractions. The work to create the base graph, then, will not be repeated often and keeping this intermediate base graph avoids extra work in each response to an abstraction change. In addition, the base graph is available for analytic functions to operate on, providing a ready way to study a representation of the graph containing all of the vertices.

Even if only a single raw graph is involved, having the base graph exist as a separate object from the raw graph permits multiple views (in separate windows) possibly involving different choices for combining edges and so on.

The first stage reduces one or more raw graphs to a base graph B, in accordance with viewer-supplied choices that specify how each raw graph is to contribute to the base graph, how the operations of combining them are defined, how multiple edges are to be reduced, if at all, and which elements, if any, are to be excluded from the base graph. In practice, this stage is often a significant component, but its details are unimportant to my invention.

In the event that only one raw graph is involved and that one does not feel a need to reduce multiple edges, one may choose to effectively skip the first stage by using the single raw graph directly as the base graph.

The second stage of my invention, which builds the abstraction graph G from the base graph B, includes the operations of computing the initial vertex set $V_{INIT}$, computing the set of showing vertices $V_{SHOW}$, setting the vertex set of the abstraction graph equal to $V_{SHOW}$, and inducing edges in the abstraction graph.

The second stage has many inputs set explicitly or implicitly by the human viewer. First, a composition graph V is needed, specifying how vertices from the raw graphs are grouped into composite vertices. The composition graph is a directed graph whose sinks are raw graph vertices and whose edges each lead from a containing composite vertex to a contained composite or raw vertex. It is acyclic and simple, but otherwise arbitrary. C may be trivial, in the sense of having no composite vertices (and no edges) or may be very complex, defining composite vertices within composite vertices to great depth. The composition graph may derive from manual grouping by the human viewer, may be built from an automated function, or may result from a combination of the two. For ease of exposition, let M denote the set of composite vertices.

The membership of a composite vertex may contain a representative member a member that serves as a leader. In hierarchical graphs, for example, this distinguished member occurs naturally: if one chooses to group vertices such that a vertex and its children form a composite, then the parent is the representative of the membership. Having a raw graph representative of a composite's membership results in presentation and navigation that is more easily understood. If composite vertex a has a representative, it will be denoted r(a). If b=r(a), one may also say that a=$r^{-1}$(b). Assignments of representatives are considered part of the composition graph.

Note that permitting composite representatives effectively implements the compound graph model of abstraction; if no representatives are defined, the clustered graph model applies.

Composite vertices defined by the composition graph may either be dispersed or marshaled. If dispersed, their contents may show (if not hidden for another reason); if marshaled, the contents will (usually) be represented by the composite vertices in the abstracted graph. The dispersal state of composite vertices is usually controlled directly by the human viewer. Let D, a subset of M, denote the set of dispersed composite vertices.

Edges in the base graph whose adjacent vertices have disappeared into marshaled composites may or may not induce edges in the abstraction. Many useful options controlling such behavior may by provided. Suppose that a marshaled composite vertex c appears in the abstraction graph, and, for the nonce, let S denote the set of descendants of c in the composition graph that do not appear in the abstraction graph. One would likely want base graph edges adjacent to some members of S to appear in the abstraction graph, adjacent to c. In other words, c would act as a proxy for a subset of S for the purpose of inducing abstraction graph edges. Several natural choices for this proxy scope arise. On one extreme, one could let c act as a proxy for all members of S. On the other extreme, one could specify that c would act as a proxy only for its representative member, should one exist. Being more generous, the proxy scope for c could be its immediate children on the composition graph, that is, the base vertices that are contained immediately in the group of vertices represented by the composite vertex. A slightly broader choice consists of the children of c and their representatives. In practice, many of these choices are useful. Clearly, other choices are possible.

It turns out that having two proxy scope settings is useful: one to be applied when considering an edge having one adjacent vertex visible and one buried in composites, and another to be used when both adjacent vertices are within marshaled composites.

In addition to offering choices of proxy scope, it is also useful to provide another option for controlling induced edges. Suppose a base graph edge joins base graph vertices v and w. If neither vertex is present in the abstraction, but proxies for both v and w do appear in the abstraction, should an edge be constructed between the proxies? Not necessarily. Those proxies may actually be the same vertex; the human viewer has the option of allowing loops to be created in such a situation; that option is embodied here in the question of whether internal edges are permitted or not.

Vertex visibility information is provided through human viewer directives and automated functions. While a vertex will either appear or not in any given abstraction graph, each vertex in the composition graph and base graph has one of three visibility settings: VISIBLE, HIDDEN, or AUTOMATIC. A vertex marked as VISIBLE will appear in the abstraction, regardless of dispersal state or visibility of any containing composite vertices. Conversely, the mark of HIDDEN will prevent a vertex from appearing. A vertex marked as AUTOMATIC will appear if there is a path from a source in the composition graph, or from another vertex that appears, to the vertex in question, that does not have a hidden or marshaled vertex. If a vertex is the representative of a composite vertex, then the visibility setting is always applied to the composite vertex and the representative acts as if it were labeled as AUTOMATIC.

All vertices in the composition graph C have a visibility setting. Let $S_V$ denote the set of vertices that are marked VISIBLE, and let $S_H$ denote the set of vertices that are marked HIDDEN. All vertices not in the union of $S_V$ and $S_H$ are considered to be marked AUTOMATIC.

In addition, base graph edges may be marked as hidden by the human viewer, and will not induce edges in the abstraction graph.

Given the composition graph and the visibility settings, one can identify a set of starting vertices $V_{INIT}=(S_V+\text{sources}(C))-S_H$. These vertices will appear in the abstraction, regardless of dispersal state of composite vertices.

To build the abstracted graph, many intermediate structures may be built. To facilitate the exposition, let A denote the allowable composition graph consisting of the composition graph C less the hidden vertices in $S_H$.

Given A, the set of showing vertices, $V_{SHOW}$, may be obtained by a forward traversal on A from the set $V_{INIT}$, by recording each vertex visited, and not traversing to children of marshaled composite vertices.

For each vertex v in the base graph, one can define the incomplete one-sided proxy function, $p_1(v)$, to be the set of vertices in the abstraction graph that act as proxies for v in the event that v does not appear in the abstraction graph, to be used when considering an edge in which exactly one of its adjacent vertices is within marshaled composites. Similarly, one can define the incomplete two-sided proxy function, $p_2(v)$, to be the set of vertices in the abstraction graph that act as proxies for v in the event that v does not appear in the abstraction graph, and to be used when considering an edge in which both adjacent vertices are within marshaled composites. In addition, one can define the complete one-sided and two-sided proxy functions, denoted $p_1^*$ and $p_2^*$, respectively. They are similar to $p_1$ and $p_2$, respectively, but are based on the entire composite graph C, rather than A. The complete proxy functions identify showing vertices that would have been proxies, had no vertices that are descendants of showing vertices been hidden. All four of these functions are computed in accordance with the choices of proxy scope set by the viewer.

As suggested hereinabove, many choices for proxy functions, driven by proxy scope choices by the viewer, are beneficial. There are several natural choices for assigning proxies; the appropriate choice, selected by the viewer, depends upon the problem and what is desired at the time. In each case, a proxy for a vertex b in B not appearing in G is a composite vertex that is in G and is an ancestor of b in C. Moreover, the proxy's ancestry from b cannot be through another vertex in G, since the latter would serve as a better proxy instead. To facilitate the discussion, one may use the following notation: given any graph H and vertex v, let $c(v|H)=\{w|(v, w) \in E(H)\}$ denote the children of vertex v in graph H. In particular, the children c (a|C) in C of composite vertex a in M constitute the membership of a.

Some natural choices for proxy functions, corresponding to suggested proxy scopes hereinabove, are listed here. In general, let p(b) denote one of the incomplete proxy functions for base vertex b and let $p^*(b)$ denote the corresponding complete proxy function. It may happen that the set p(b) contains many members, one member, or none, with similar behavior for $p^*(b)$.

For the proxy scope of representative only, one has $$p(b) = \begin{cases} \{r^{-1}(b)\}, & \text{if } r^{-1}(b) \text{ exists and } r^{-1}(b) \in V(G); \\ \phi, & \text{otherwise,} \end{cases}$$

with $$p^*(b) = \begin{cases} \{r^{-1}(b)\}, & \text{if } r^{-1}(b) \text{ exists and } r^{-1}(b) \in V(G); \\ \phi, & \text{otherwise.} \end{cases}$$

For the proxy scope of immediate children, one has $$p(b)=\{v \in V(G)|b \in c(v|A)\}$$

with $$p^*(b)=\{v \in V(G)|b \in c(v|C)\}$$

For the proxy scope of immediate children and their representatives, one has $$p(b) = \begin{cases} \{v \in V(G) | b \in c(v|A) \text{ or } r^{-1}(b) \in c(v|A)\}, & \text{if } r^{-1}(b) \text{ exists;} \\ \{v \in V(G) | b \in c(v|A)\} & \text{otherwise,} \end{cases}$$

with $$p^*(b) = \begin{cases} \{v \in V(G) | b \in c(v|C) \text{ or } r^{-1}(b) \in c(v|C)\}, & \text{if } r^{-1}(b) \text{ exists;} \\ \{v \in V(G) | b \in c(v|C)\} & \text{otherwise,} \end{cases}$$

And for the proxy scope of all descendants, one has $$p(b) = \{v \in V(G) | \exists \text{ directed path } (v, v_1, v_2, \ldots, v_n, b) \text{ in } A$$
$$\Subset_{v_i \notin V(G) \forall i}\}$$

with $$p^*(b) = \{v \in V(G) | \exists \text{ directed path } (v, v_1, v_2, \ldots, v_n, b) \text{ in } C$$
$$\Subset_{v_i \notin V(G) \forall i}\}$$

According to an aspect of my invention, the last major step in constructing an abstraction graph is to examine each edge in the base graph, one at a time, and determine what edges, if any, should be induced in the abstraction graph to reflect said base graph edge. Each determination is based on what vertices appear in the abstraction graph and on the proxy functions. The edges are induced as needed as the process proceeds.

It is highly desirable to provide cues to the viewer of an abstraction graph that indicate where elision has taken place, thereby indicating where further investigation will be fruitful and avoiding misrepresentation. According to an aspect of my invention, this strongly-felt desire may be met by marking vertices in the abstraction graph as having torn edges. The process of determining such markings is best conducted by examining each base graph edge in turn as part of the process of inducing edges in the abstraction graph. Consider, for example, a base graph edge (a, b) in B such that a is in G, but where no proxy for b is present in the abstraction. Then (a, b) will induce no edges in C, and a will lack an otherwise-expected adjacent edge. To alert the viewer that a neighbor for a exists and that a potential outgoing edge could be added by suitable changes in visibility, the vertex a may be marked as having outgoing torn edges. Alternatively, if a is not in G but has proxies in G, then those proxies may be marked as having outgoing torn edges. Similarly, if instead b is in G and a has no proxies, then b would be marked as having incoming torn edges. More generally, when an edge fails to appear because an endpoint does not have a proxy in the appropriate incomplete proxy function, torn edge markings should result at each vertex that would have had an induced edge if the vertex did have a proxy. To determine what vertices would have been proxies, the complete proxy functions are used.

In more detail, now, consider the handling of a single base graph edge $e=(v_1, v_2)$, in which the two issues of inducing edges in the abstraction graph and of marking vertices with torn edges in the abstraction graph are to be addressed. Two steps may be taken. First, all appropriate edges will be induced in the abstraction graph. Second, if no edges were induced in the abstraction graph, proxy vertices will be marked as having torn edges, as appropriate. The second step is not taken if edges were induced in the first step.

For this discussion, define, for any base vertex v, $$g(v) = \begin{cases} r^{-1}(v), \text{ if } r^{-1}(v) \text{ exists and } r^{-1}(v) \in V(G); \\ v, \text{ otherwise.} \end{cases}$$

The first step may be broken down by case. In the case that the edge should be hidden, as directed by the viewer, the first step is complete without inducing any edges. In the case that both $g(v_1)$ and $g(v_2)$ are in G, an edge from $g(v_1)$ to $g(v_2)$ is added to G. In the case that $g(v_1)$ is present in G but $g(v2)$ is not, edges may be induced in G going from $g(v_1)$ to proxies of $v_2$. Similarly, if $g(v_2)$ is present in G but $g(v_1)$ is not, edges may be induced in G going from proxies of $v_1$ to $g(v_2)$. In the case that neither $g(v_1)$ nor $g(v_2)$ is present in G, then edges may be induced in G going from proxies of $v_1$ to proxies of $v_2$. The details of which proxies are involved depend upon the desires of the viewer and the embodiment of my invention.

The second step, that of marking vertices as having torn edges, may also be divided by case. In the case that both $g(v_1)$ and $g(v_2)$ are in G, the vertex $g(v_1)$ is marked as having outgoing torn edges and the vertex $g(v_2)$ is marked as having incoming torn edges. In the case that $g(v_1)$ is present in G but $g(v_2)$ is not, $g(v_1)$ may be marked as having outgoing torn edges and proxies of $v_2$ may be marked as having incoming torn edges. Similarly, in the case that $g(v_2)$ is present in G but $g(v_1)$ is not, proxies of $v_1$ may be marked as having outgoing edges and $g(v_2)$ may be marked as having incoming torn edges. In the case where neither $(v_1)$ nor $g(v_2)$ is present in G, then proxies of $v_1$ may be marked as having outgoing torn edges and proxies of $v_2$ may be marked as having incoming torn edges. The details of this step depend upon the desires of the viewer and the embodiment of my invention.

According to these observations and an aspect of my invention, there is provided a method for building an abstraction graph from a set of raw graphs in accordance with a composition graph, a visible vertices set, a hidden vertices set, a dispersed composite vertices set, and a hidden edge set, comprising the steps of building a base graph from said set of raw graphs; computing a set of starting vertices consisting of a union of the visible vertices set and the set of source vertices of the composition graph, less the hidden vertices set; determining a set of showing vertices by recording each vertex visited in a directed traversal on the composition graph from said set of starting vertices, said directed traversal excluding the members of the hidden vertices set, and said directed traversal excluding edges leaving vertices that are not members of the dispersed composite vertices set; placing the members of said set of showing vertices in the abstraction graph as its vertices; computing a set of proxy functions, each member of which maps each vertex in said base graph that is not in said set of showing vertices to a subset of the members of said set of showing vertices; and inducing edges in the abstraction graph from edges in the base graph using said set of proxy functions to map adjacent vertices of edges in the base graph to vertices in the abstraction graph.

BRIEF DESCRIPTION OF DRAWINGS

My invention may be best understood by reading the specification with reference to the accompanying figures, in which.

DETAILED DESCRIPTION

Figure 1:
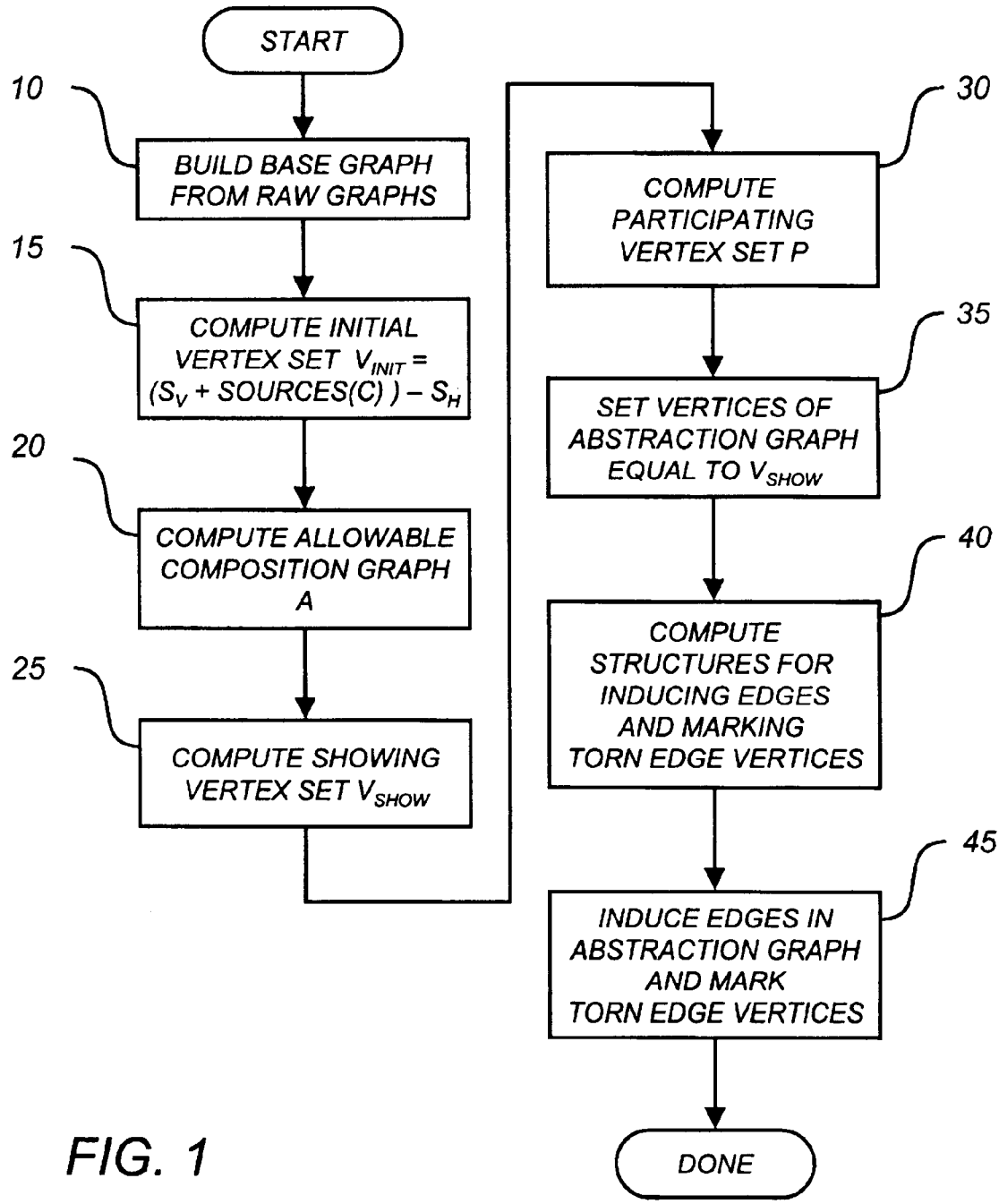
FIG. 1 is a flow chart of a preferred embodiment of my invention.

A high-level diagram of my invention is shown in FIG. 1, which illustrates my method for building an abstraction graph, G, from a set of raw graphs in accordance with a composition graph, C, a visible vertices set, $S_V$, a hidden vertices set, $S_H$, a dispersed composite vertices set, and a hidden edge set.

Figure 2:
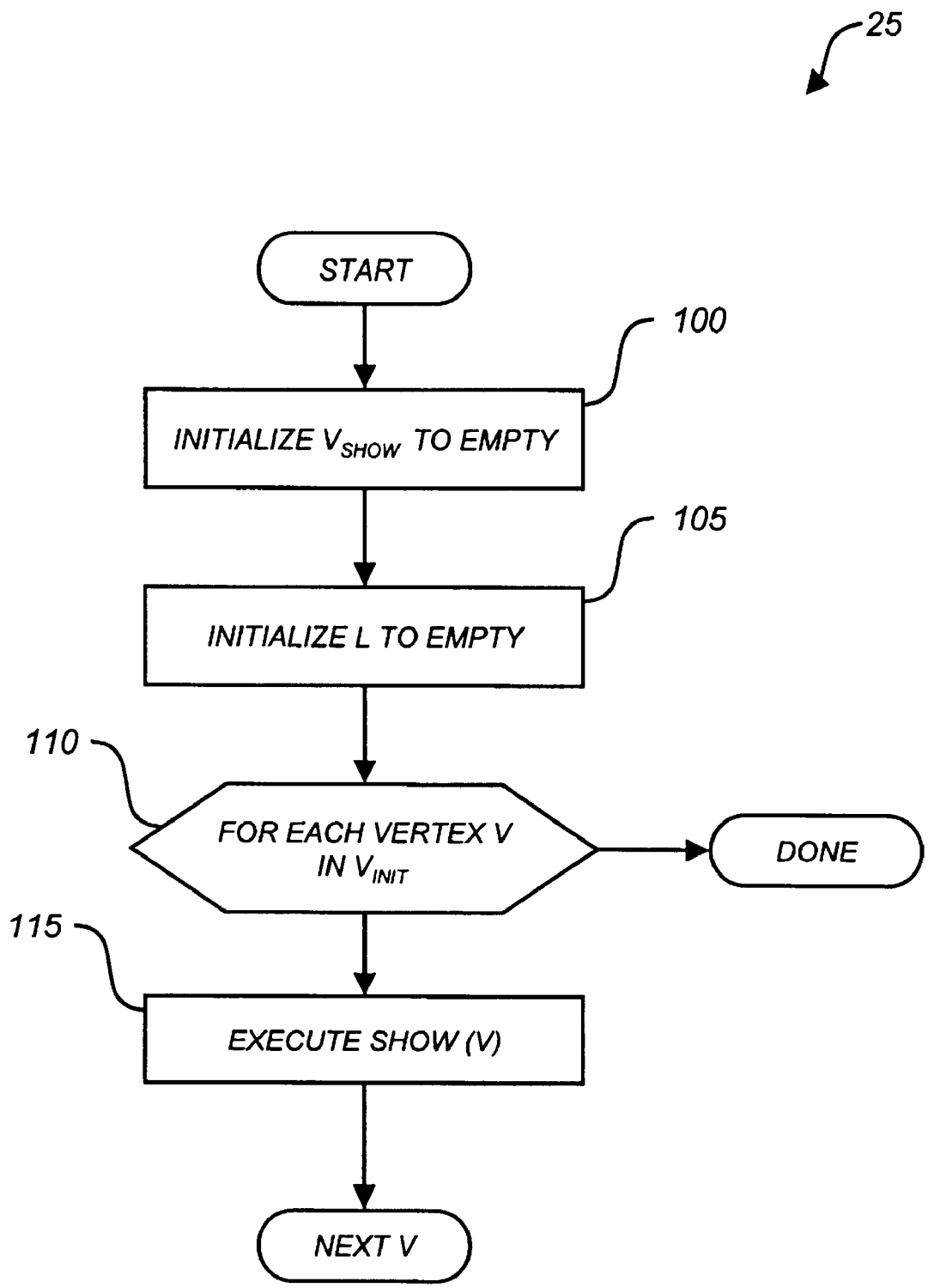
FIG. 2 is a preferred embodiment of step 25 of my invention, in which a showing vertex set in computed.
Figure 4:
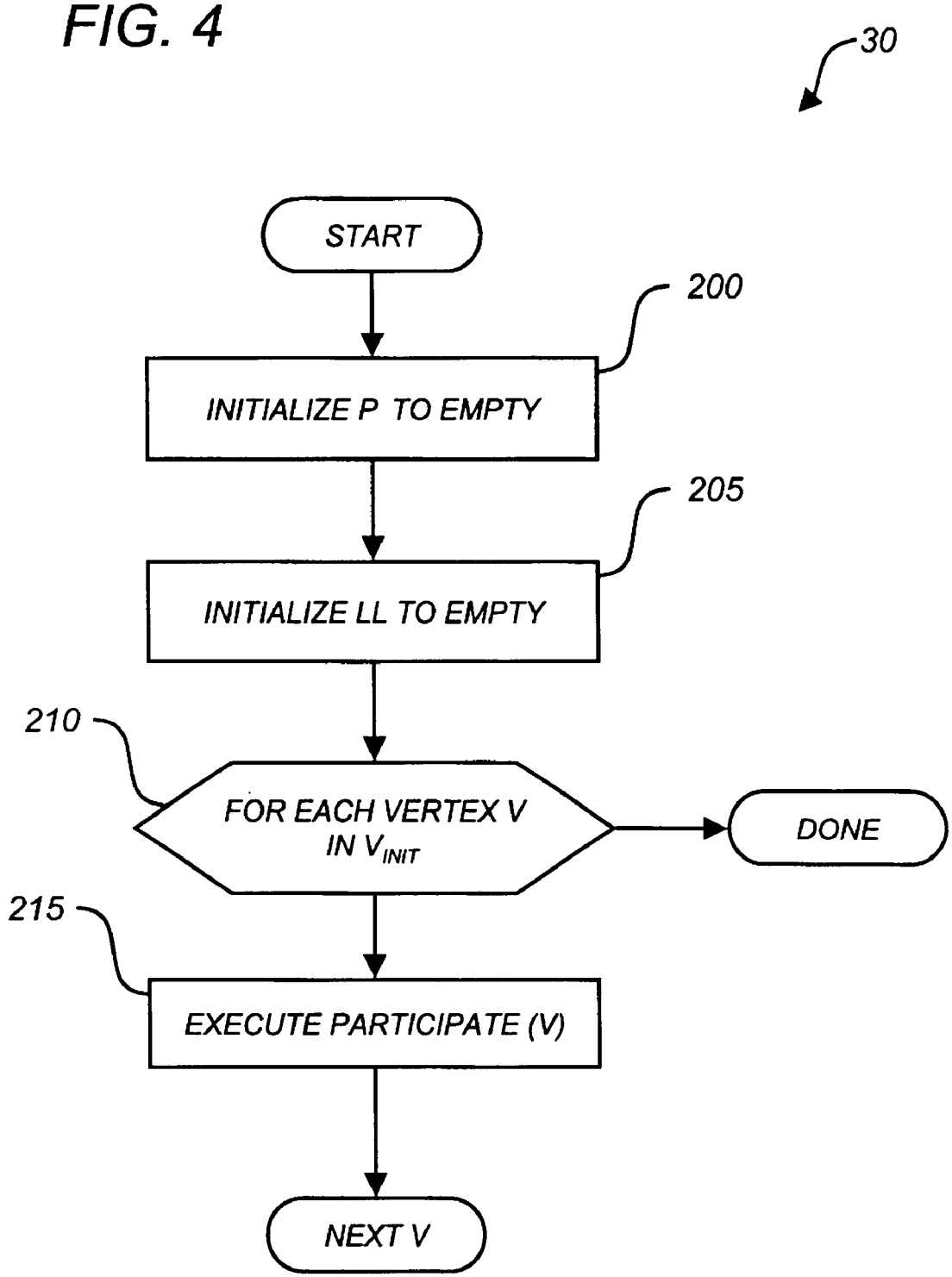
FIG. 4 shows a preferred embodiment of step 30 of my invention, and computes a set of participating vertices.
Figure 6:
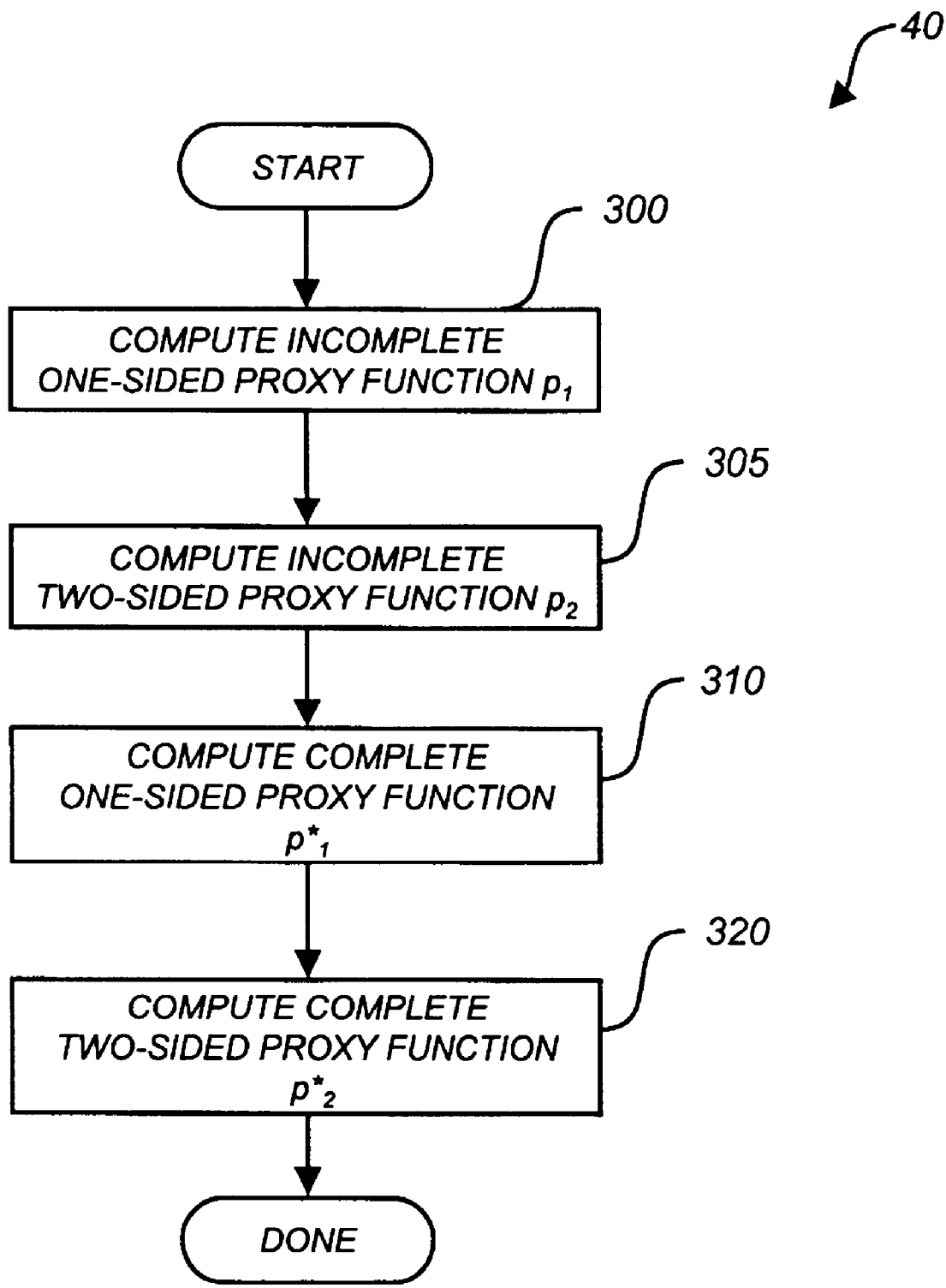
FIG. 6 illustrates a preferred embodiment of step 40 of my invention, in which proxy functions are prepared.
Figure 9:
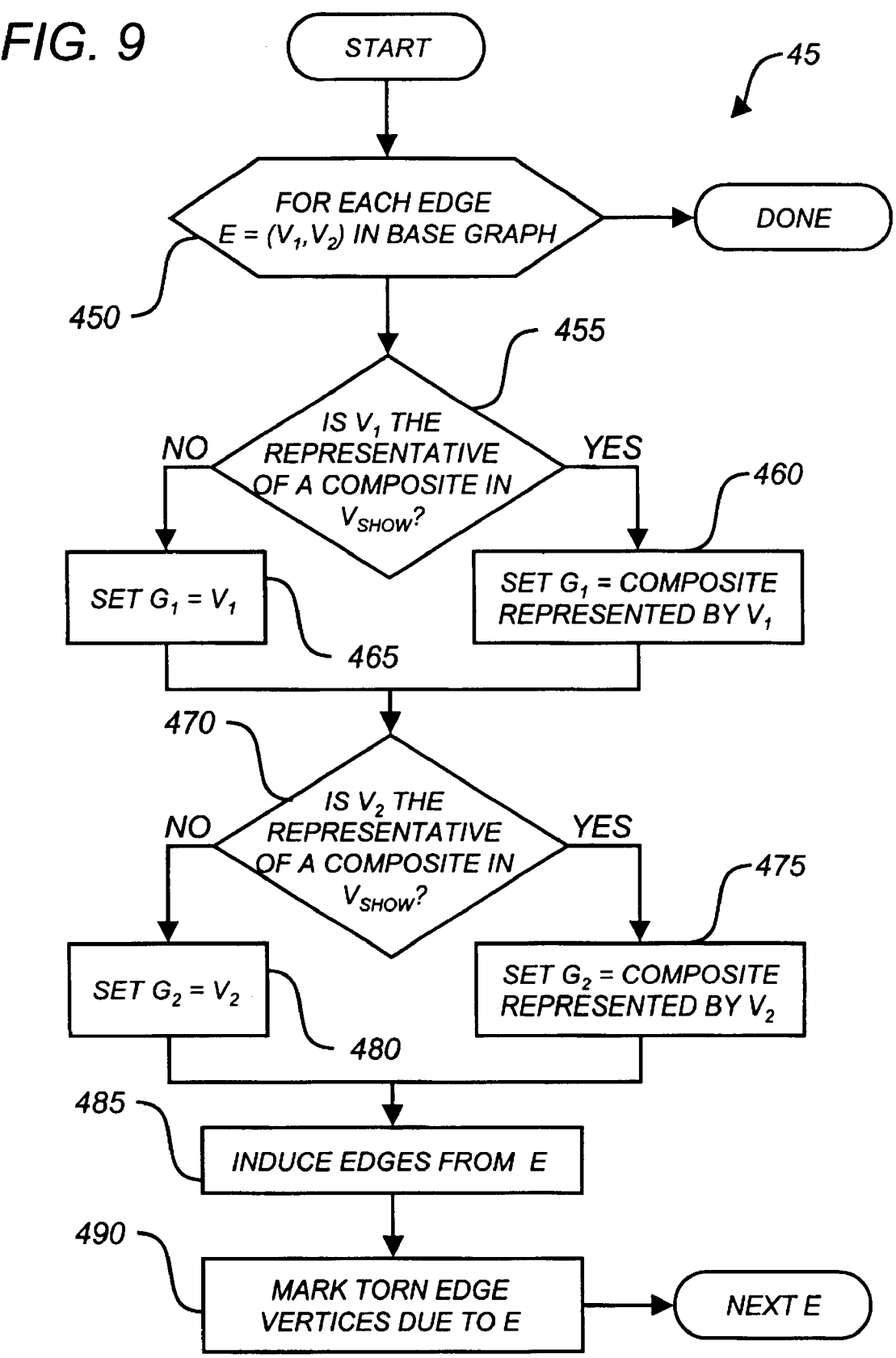
FIG. 9 illustrates a preferred embodiment of step 45, which induces edges in the abstraction graph and marks torn edge vertices.

The method begins in step 10, in which a collection of raw graphs is combined and reduced to produce a base graph. The collection of raw graphs may consist of only one member, or may contain more than one raw graph. In the latter case, the members may be added, subtracted, or otherwise combined in a manner chosen by the viewer. Multiple edges between the same pair of vertices may be reduced in number, and vertices or edges not desired may be excluded by step 10. Thereafter, step 15 computes the set of starting vertices, $V_{INIT}$, consisting of a union of the visible vertices set and the set of source vertices of the composition graph, less the hidden vertices set. An allowable composition graph, A, is obtained in step 20 from the composition graph, C, by removing from C the members of hidden vertices set, $S_H$. In step 25 a showing vertex set $V_{SHOW}$ is computed. (A preferred embodiment of step 25 is shown in FIG. 2.) Thereafter, a participating vertex set, P, is computed in step 30; the participating vertex set will then consist of the vertices in the base graph that can contribute to the showing vertex set. (A preferred embodiment of step 30 is illustrated in FIG. 4.) In step 35 the abstraction graph is begun by setting its vertices to those in the showing vertex set $V_{SHOW}$. Step 35 computes structures for inducing edges and marking torn edge vertices. (A preferred embodiment of step 40 is illustrated in FIG. 6.) Thereafter, step 45 induces edges in the abstraction graph and marks torn edge vertices, using the structures computed by step 40. (A preferred embodiment of step 45 is illustrated in FIG. 9.)

FIG. 2 illustrates a preferred embodiment of step 25, in which a showing vertex set, $V_{SHOW}$, is computed. It begins with step 100, wherein the showing vertex set is initialized to empty. Another preparatory step, 105, initializes a set L to empty. Set L is used only to keep track of vertices that have been visited. Thereafter, step 110 effects a loop in which each vertex V of the set of starting vertices, $V_{INIT}$, is examined in turn, causing step 115 to be performed for each vertex. Step 115 executes the SHOW function (amplified in FIG. 3) on the vertex under examination.

Figure 3:
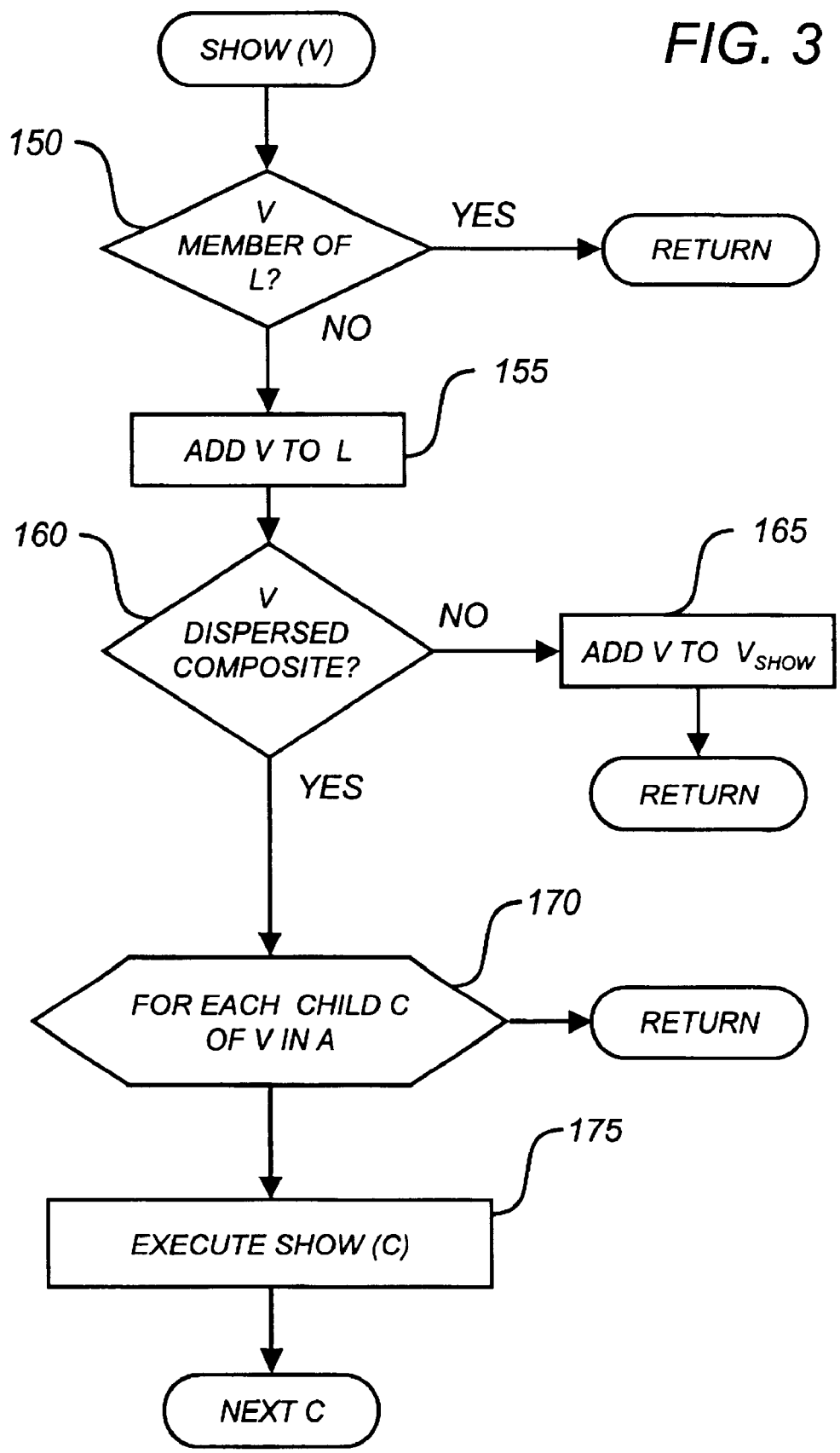
FIG. 3 describes the SHOW function introduced in step 115 of FIG. 2.

FIG. 3 describes the SHOW function operating on a vertex V. Step 150 tests whether the argument V has been visited already by looking for its membership in set L; if V is in L, then control is returned from the SHOW function. Otherwise, V is added to L in step 155, whereupon step 160 tests whether V is a dispersed composite vertex. If not, then V should appear in the abstraction graph, so step 165 adds V to the showing vertex set, $V_{SHOW}$. Otherwise, loop step 170 is performed, wherein each child C of V in the allowable composition graph A is examined in turn, causing step 175 to be performed for each. Step 175 executes the SHOW function on the child currently under examination, thereby performing recursion. Upon completion of step 170, control returns from the SHOW function.

FIG. 4 shows a preferred embodiment of step 30, and computes a set of participating vertices P. The first step, 200, initializes P to empty. A second preparatory step, 205, initializes a set LL to empty. This set is used merely to note which vertices have been visited. Thereafter, step 210 effects a loop wherein each vertex V in the set of starting vertices $V_{INIT}$ is examined in turn, causing step 215 to be performed for each such vertex. Step 215 executes the PARTICIPATE function (amplified in FIG. 5) on the vertex under examination.

Figure 5:
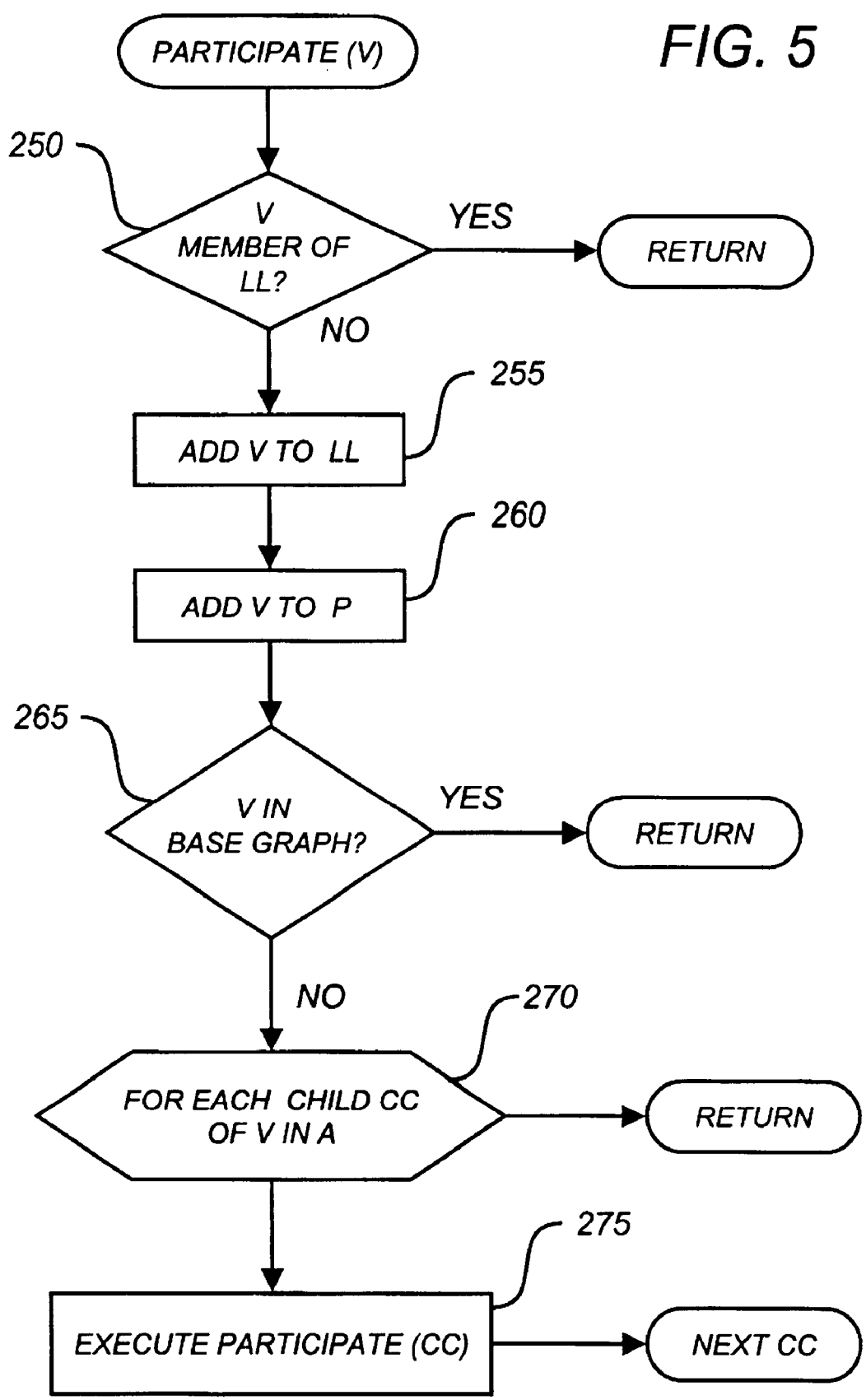
FIG. 5 describes the PARTICIPATE function introduced in step 215 of FIG. 4.

FIG. 5 describes the PARTICIPATE function operating on a vertex V. Step 250 tests whether the argument V has been visited already by looking for its membership in set LL; if V is in LL, then control is returned from the PARTICIPATE function. Otherwise, V is added to LL in step 255, whereupon step 260 also adds V to the set of participating vertices P. Thereafter, step 265 tests if argument V is a base graph vertex. If so, control is returned from the PARTICIPATE function. Otherwise, step 270 is performed, which effects a loop wherein each child CC of argument V in the allowable composition graph A is examined in turn, causing step 275 to be performed for each. Step 275 executes the PARTICIPATE function on the child currently under examination, thereby performing recursion. Upon completion of step 270, control returns from the PARTICIPATE function.

Figure 7:
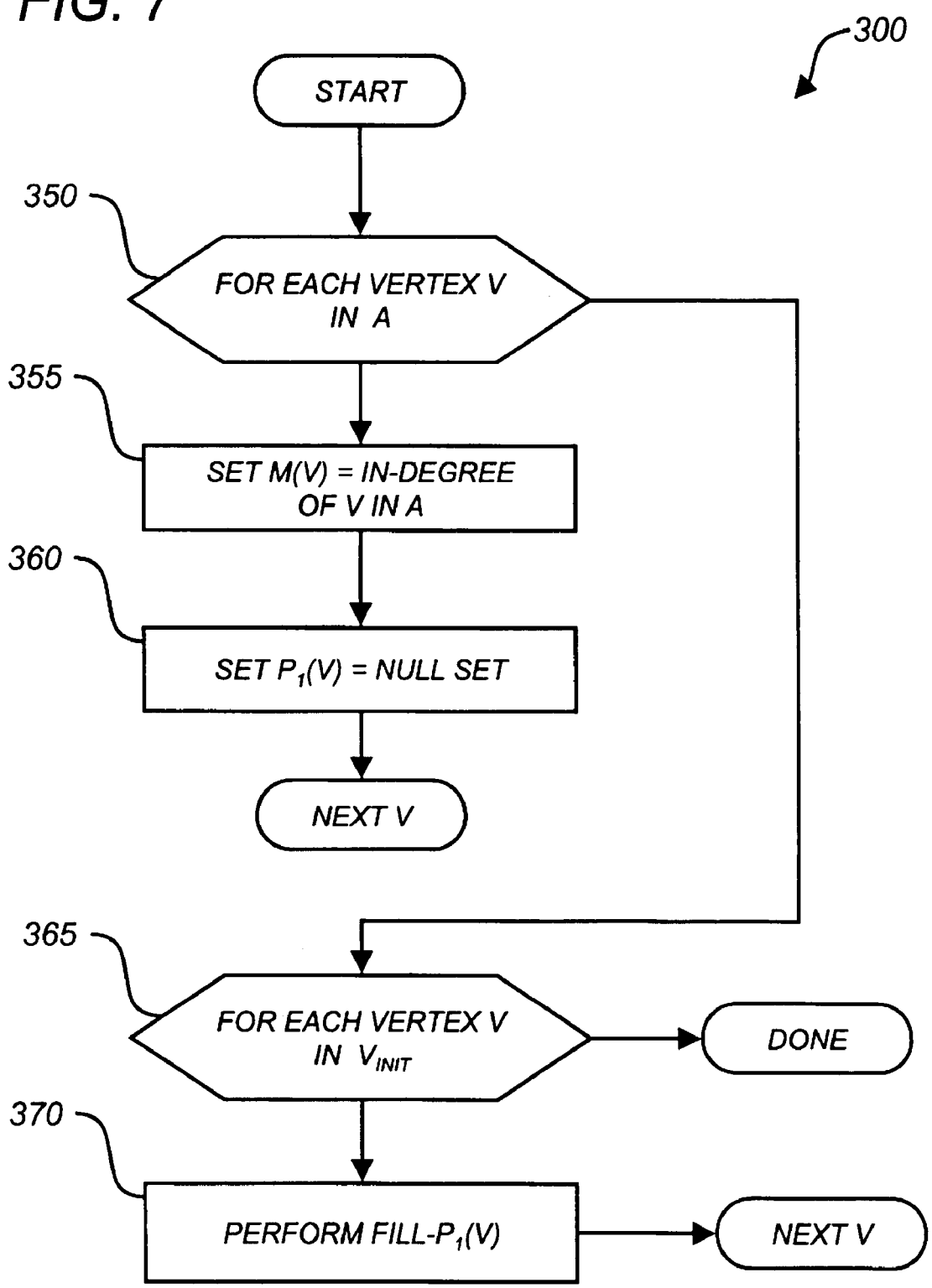
FIG. 7 shows a preferred embodiment of step 300, implementing one of the incomplete proxy functions.

FIG. 6 illustrates a preferred embodiment of step 40 of my invention, in which proxy functions are prepared. Step 300 computes an incomplete one-sided proxy function, $p_1$, implementing one of many suitable proxy scopes. (A preferred embodiment of step 300, implementing one of the incomplete proxy functions, is shown in FIG. 7.) Step 305 computes an incomplete two-sided proxy function, $p_2$, implementing one of many suitable proxy scopes. Step 310 computes a complete one-sided proxy function, $p_1^*$, according to the same proxy scope as step 300. Step 320 computes a complete one-sided proxy function, $p_2^*$, according to the same proxy scope as step 305.

FIG. 7 shows a preferred embodiment of step 300, implementing one of the incomplete proxy functions. The illustration shows an implementation that is in accordance with the proxy scope in which all descendants of a showing vertex are in its proxy scope. Initialization is performed by step 350, which effects a loop wherein each vertex V in the allowable composition graph A is considered in turn, performing steps 355 and 360 for each. Step 355 sets a parent count value M(V) equal to the in-degree of vertex V in the allowable composition graph A. Step 360 sets the incomplete one-sided proxy function value $p_1(V)$ equal to empty. Upon completion of the loop, step 350 passes control to step 365, which effects a loop wherein each vertex V in the set of starting vertices $V_{INIT}$ is examined in turn, causing step 370 to be performed for each such vertex. Step 370 executes the FILL-P1 function on the argument of vertex V function (amplified in FIG. 8) on the vertex under examination. Upon completion of the loop, step 300 is complete.

Figure 8:
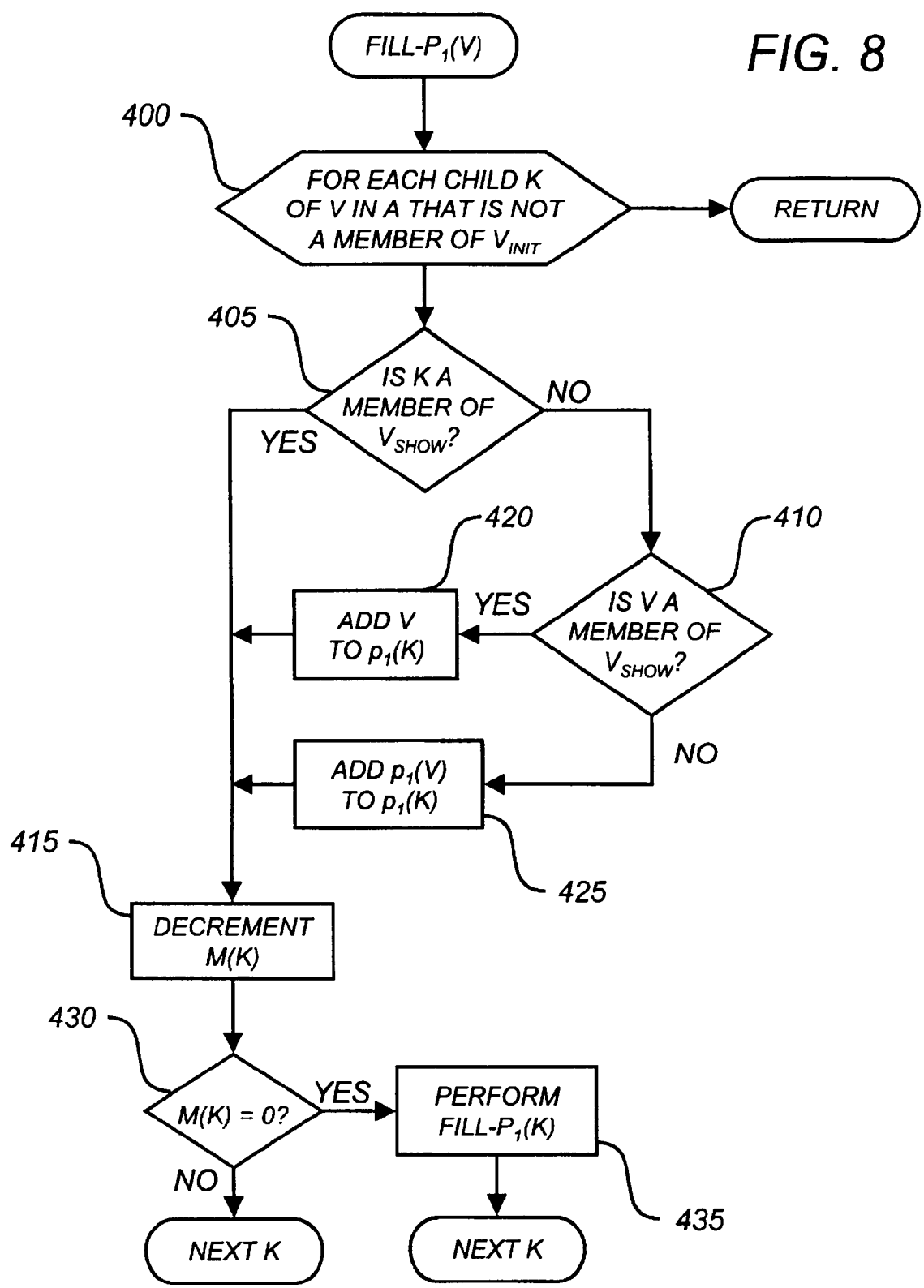
FIG. 8 describes the FILL-P1(V) function introduced in step 370 of FIG. 7.

FIG. 8 describes the FILL-P1 function, introduced in step 370 of FIG. 7, with argument of vertex V. The entirety of the FILL-P1 function consists of a loop effected by step 400, wherein each child K of argument V in the allowable composition graph A and also not a member of the set of starting vertices $V_{INIT}$ is examined in turn. For each child K, step 405 is performed, which tests if K is a member of the showing vertex set $V_{SHOW}$; if K is not a member of $V_{SHOW}$, step 410 is performed; otherwise, step 415 is performed. Step 410 tests if argument V is a member of the showing vertex set $V_{SHOW}$; if V is a member of the showing vertex set $V_{SHOW}$, step 420 is performed and step 415 is performed thereafter; else 425 is performed and step 415 is performed thereafter. Step 420 adds argument V to the incomplete one-sided proxy function set $p_1(K)$. Step 425 adds the members of the incomplete one-sided proxy function set $p_1(V)$ to the incomplete one-sided proxy function set $p_1(K)$. Step 415 decrements the parent count value M(K). After performing step 415, step 430 is performed, which tests if M(K) is zero; if it is, step 435 is performed before completing the loop. Step 435 performs the FILL-P1 function on the argument K, thereby effecting recursion.

FIG. 9 illustrates a preferred embodiment of step 45, which induces edges in the abstraction graph and marks torn edge vertices. This embodiment consists of a single loop effected by step 450, wherein each edge E in the base graph is examined in turn, said edge E going from an initial vertex $V_1$ to a terminal vertex $V_2$. Within the loop, the first step, 455, tests if $V_1$ is the representative of a composite vertex contained in the showing vertex set $V_{SHOW}$; if it is, a vertex variable $G_1$ is set equal to that representative of a composite vertex (in step 460); if not, a vertex variable $G_1$ is set equal to $V_1$ (in step 465). Thereafter, step 470 tests if $V_2$ is the representative of a composite vertex contained in the showing vertex set $V_{SHOW}$; if it is, a vertex variable $G_2$ is set equal to that representative of a composite vertex (in step 475); if not, a vertex variable $G_2$ is set equal to $V_2$ (in step 480). Thereafter, step 485 induces edges in the abstraction graph from edge E and step 490 marks vertices as having torn edges due to edge E.

Figure 10:
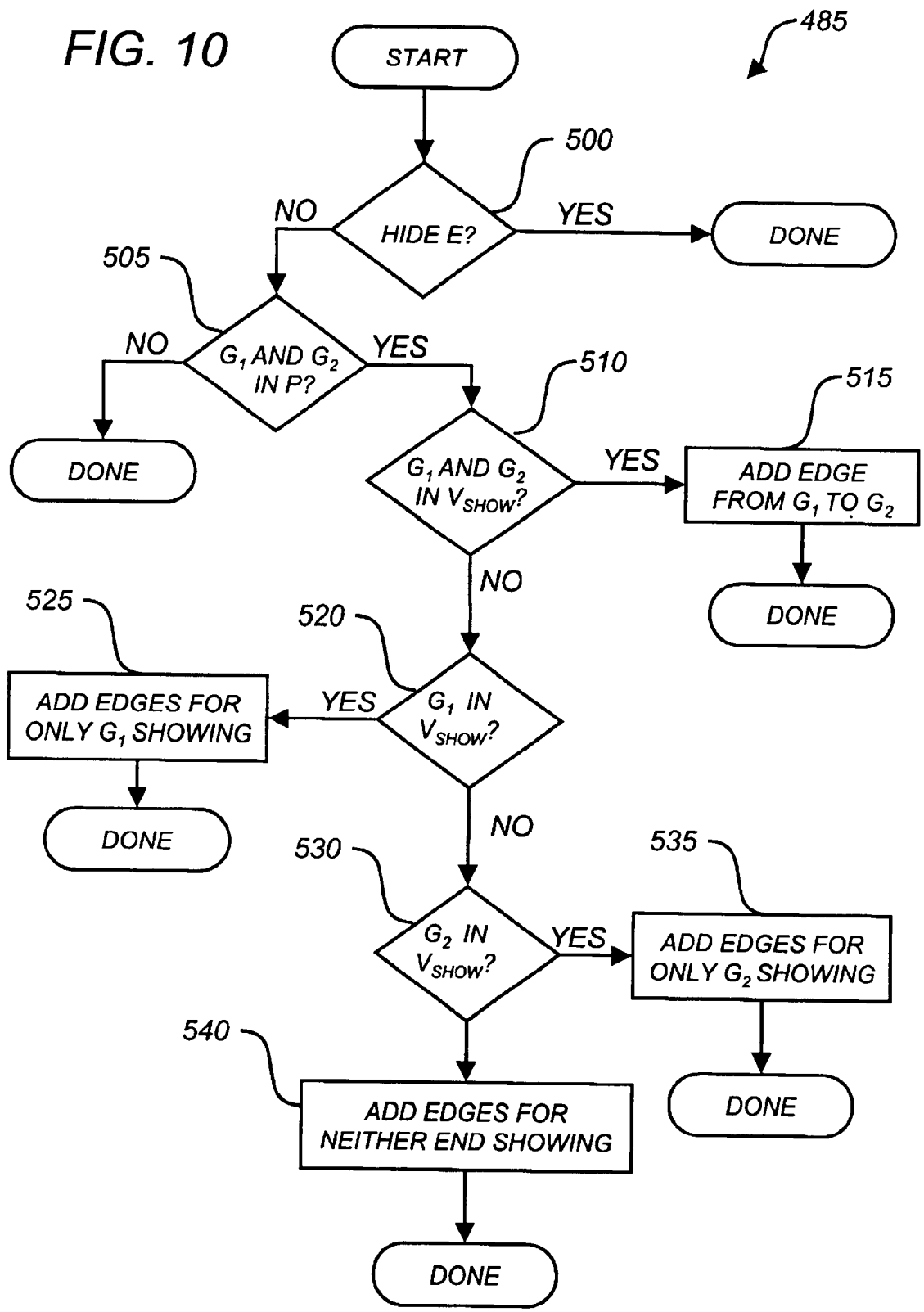
FIG. 10 illustrates a preferred embodiment of step 485, which induces edges in the abstraction graph from a given base graph edge E.

FIG. 10 illustrates a preferred embodiment of step 485, which induces edges in the abstraction graph from a given base graph edge E. If E is contained in the hidden edge set, step 500 directs the termination of step 485 without further activity; otherwise, control passes to decision step 505; wherein step 485 is terminated if either vertex variable $G_1$ or vertex variable $G_2$ is a vertex not contained in the set of participating vertices P; otherwise, control passes to decision step 510. Step 510 dictates that if both vertex variable $G_1$ and vertex variable $G_2$ are vertices contained in the showing vertex set $V_{SHOW}$, then step 515 is performed and step 485 is terminated thereafter; otherwise, control passes to decision step 520. Step 515 adds an edge in the abstraction graph, going from the vertex specified by vertex variable $G_1$ to the vertex specified by vertex variable $G_2$. Step 520 dictates that if vertex variable $G_1$ is a vertex contained in the showing vertex set $V_{SHOW}$, then step 525 is performed and step 485 is terminated thereafter; otherwise, control passes to decision step 530. Step 525 adds edges to the abstraction graph when only the vertex indicated by vertex variable $G_1$ is showing. (Step 525 is amplified in FIG. 11.) Step 530 dictates that if vertex variable $G_2$ is a vertex contained in the showing vertex set $V_{SHOW}$ then step 535 is performed and step 485 is terminated thereafter; otherwise, otherwise step 540 is performed and step 485 is terminated thereafter. Step 535 adds edges to the abstraction graph when only the vertex indicated by vertex variable $G_2$ is showing. (Step 535 is amplified in FIG. 12.) Step 540 adds edges to the abstraction graph when neither end is showing. (Step 540 is amplified in FIG. 13.)

Figure 11:
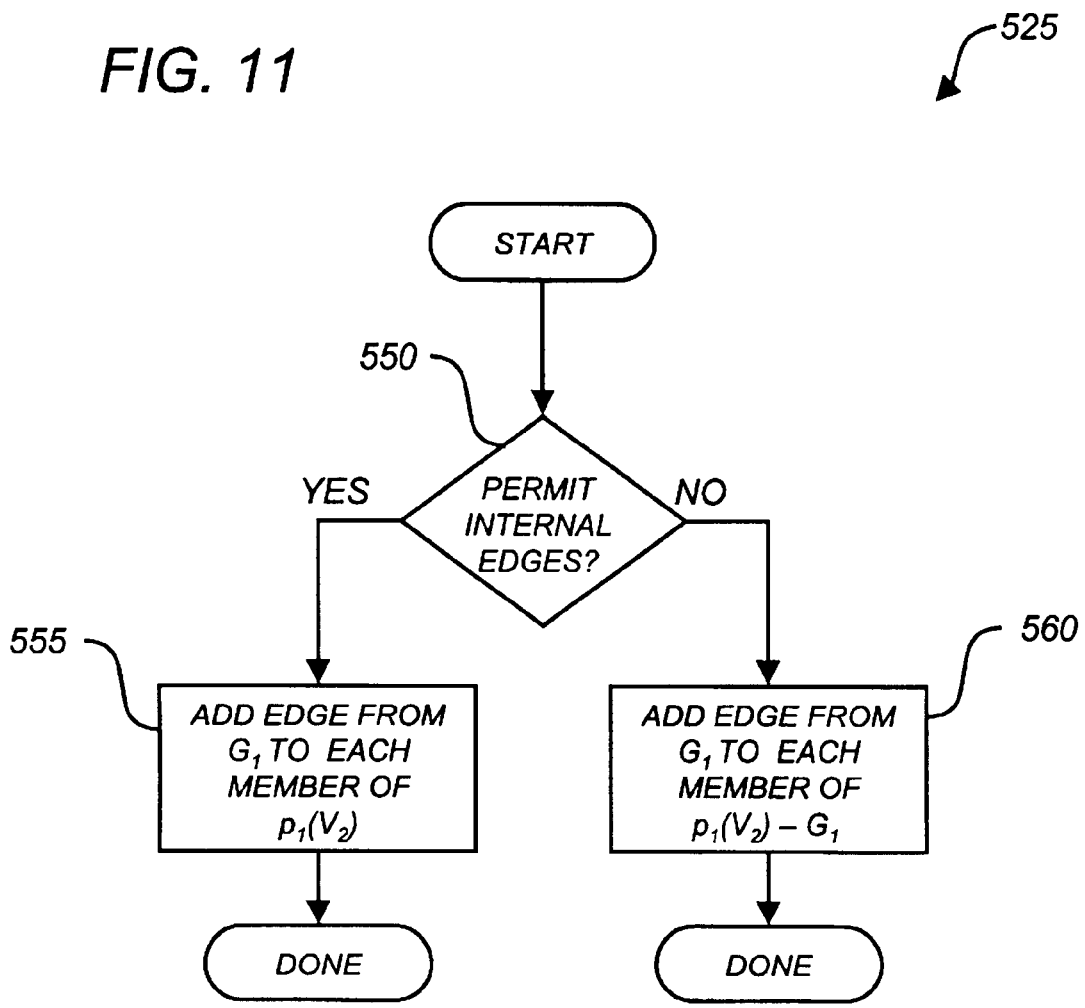
FIG. 11 illustrates a preferred embodiment of step 525, which adds edges to the abstraction graph given base graph edge E when only the vertex indicated by vertex variable $G_1$ is showing.

FIG. 11 is a preferred embodiment of step 525, which adds edges to the abstraction graph given base graph edge E when only the vertex indicated by vertex variable $G_1$ is showing. If internal edges are permitted, step 550 dictates that step 555 be performed; otherwise, step 550 dictates that step 560 be performed. Step 555 adds an edge to the abstraction graph from the vertex specified by vertex variable $G_1$ to each member of the incomplete one-sided proxy function set, evaluated on the terminal vertex $V_2$ that is, to each member of $p_1(V_2)$. Step 560 adds an edge to the abstraction graph from the vertex specified by vertex variable $G_1$ to each member of the incomplete one-sided proxy function set, evaluated on the terminal vertex $V_2$ less the vertex specified by vertex variable $G_1$, that is, to each member of $p_1(V_2)-\{G_1\}$. (In the event that $p_1(V_2)-\{G_1\}$ is empty, no edges are edges are added.)

Figure 12:
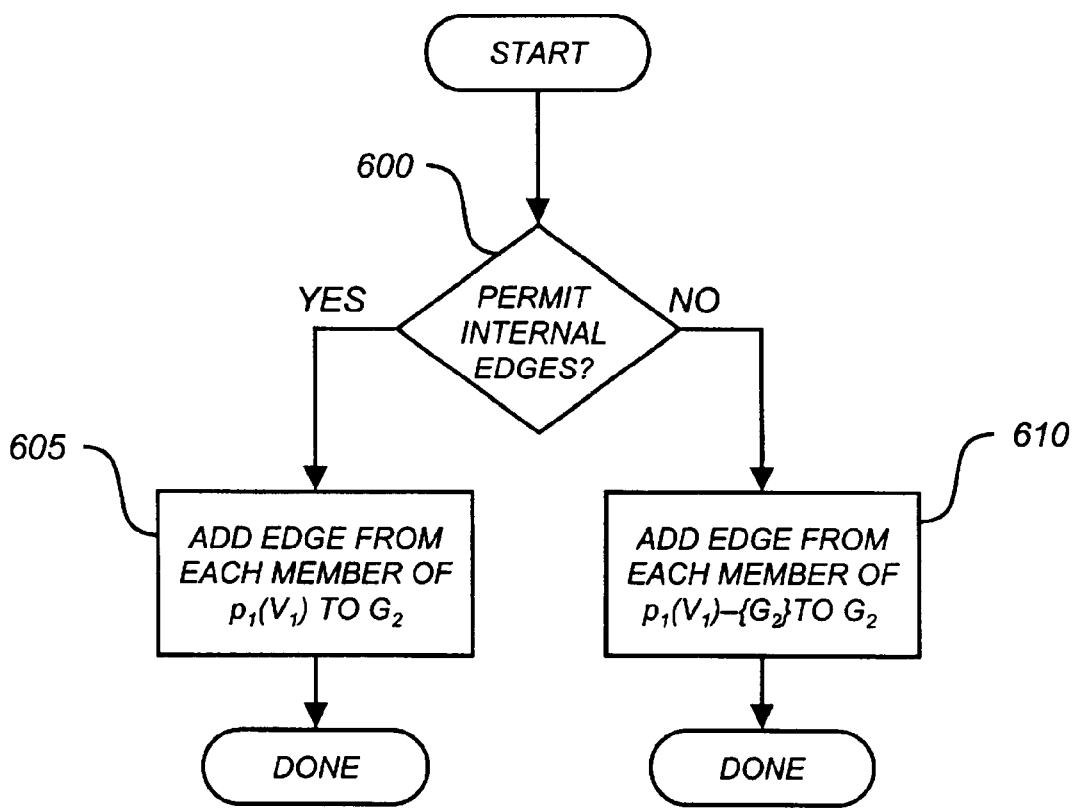
FIG. 12 illustrates a preferred embodiment of step 535, which adds edges to the abstraction graph given base graph edge E when only the vertex indicated by vertex variable $G_2$ is showing.

FIG. 12 is a preferred embodiment of step 535, which adds edges to the abstraction graph given base graph edge E when only the vertex indicated by vertex variable $G_2$ is showing. If internal edges are permitted, step 600 dictates that step 605 be performed; otherwise, step 600 dictates that step 610 be performed. Step 605 adds an edge to the abstraction graph going to the vertex specified by vertex variable $G_2$ from each member of the incomplete one-sided proxy function set, evaluated on the initial vertex $V_1$, that is, from each member of $p_1(V_1)$. Step 610 adds an edge to the abstraction graph going to the vertex specified by vertex variable $G_2$ from each member of the incomplete one-sided proxy function set, evaluated on the initial vertex $V_1$, less the vertex specified by vertex variable $G_2$, that is, from each member of $p_1(V_1)-\{G_2\}$. (If $p_1(V_1)-\{G_2\}$ is empty, no edges are added.)

Figure 13:
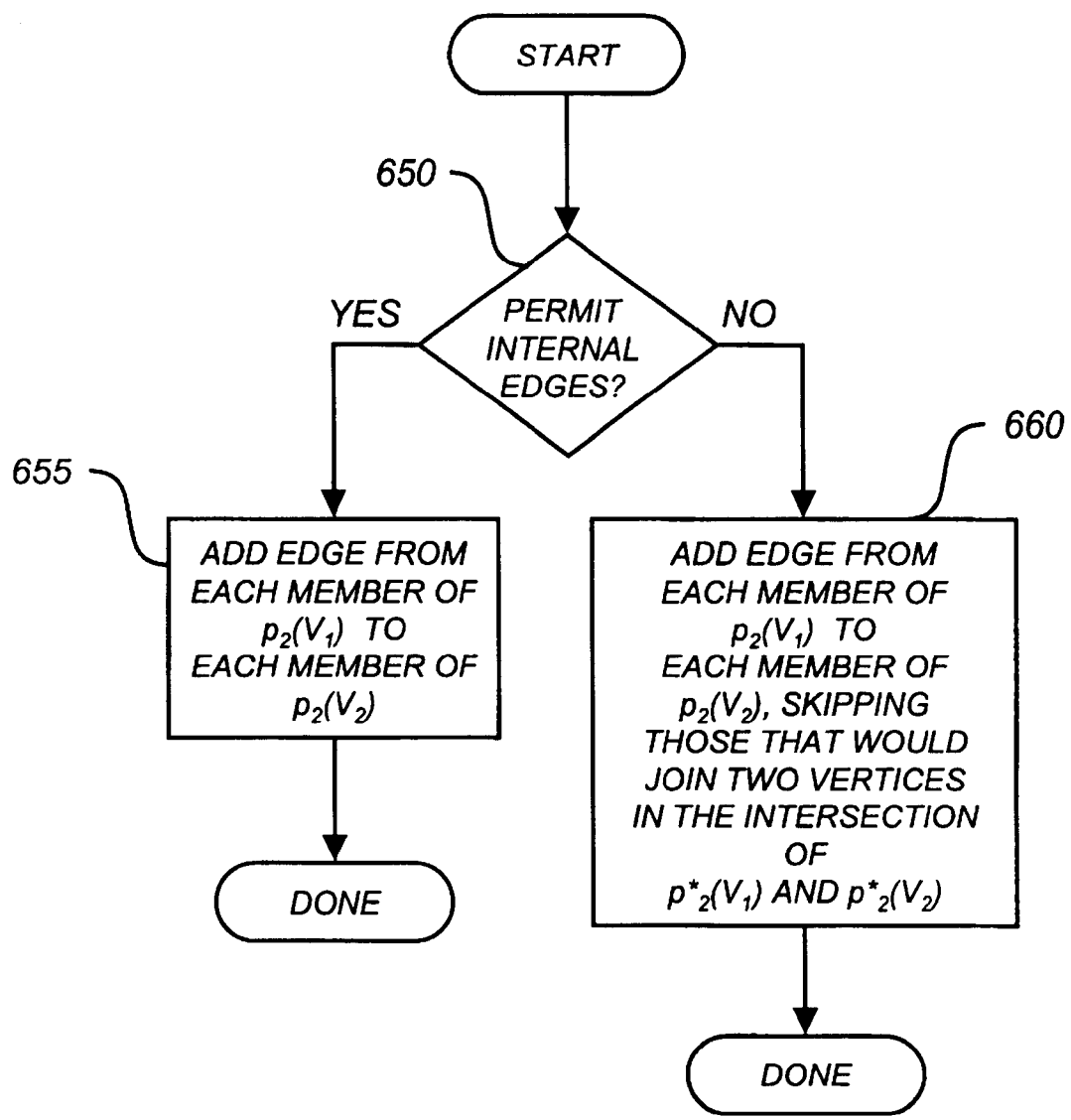
FIG. 13 illustrates a preferred embodiment of step 540, which adds edges to the abstraction graph given base graph edge E when neither end is showing.

FIG. 13 is a preferred embodiment of step 540, which adds edges to the abstraction graph given base graph edge E when neither end is showing. If internal edges are permitted, step 650 dictates that step 655 be performed; otherwise, step 650 dictates that step 660 be performed. Step 655 adds an edge to the abstraction graph from each member of the incomplete two-sided proxy function set, evaluated on the initial vertex $V_1$, that is, from each member of $p_2(V_1)$, to each member of the incomplete two-sided proxy function set, evaluated on the terminal vertex $V_2$, that is, to each member of $p_2(V_2)$. Step 660 adds an edge to the abstraction graph from each member of the incomplete two-sided proxy function set, evaluated on the initial vertex $V_1$, that is, from each member of $p_2(V_1)$, to each member of the incomplete two-sided proxy function set, evaluated on the terminal vertex $V_2$, that is, to each member of $p_2(V_2)$, less those edges that would join two vertices that are members of the intersection of sets $p^*_2(V_1)$ and $p^*_2(V_2)$. (It may happen that no edges are added.)

Figure 14:
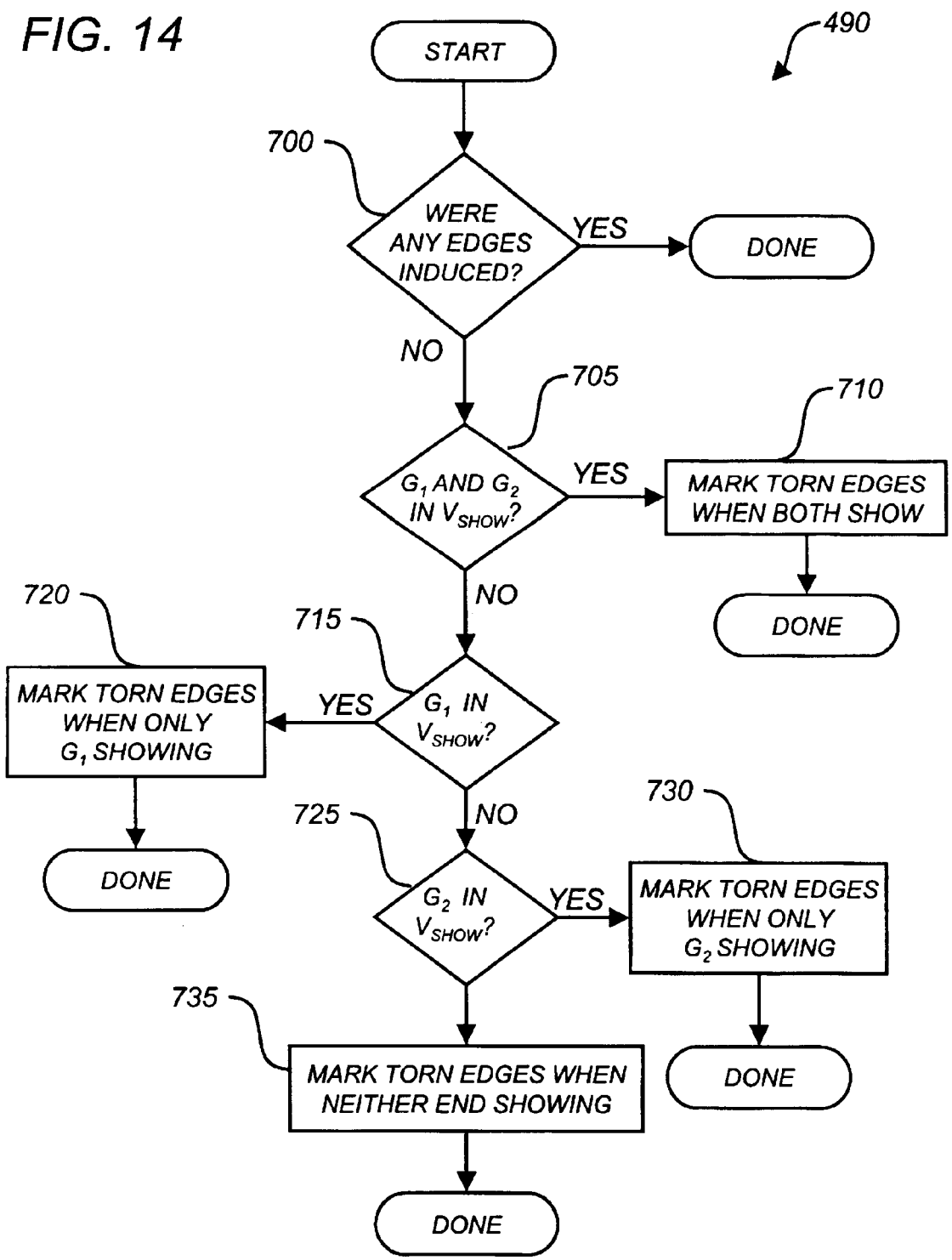
FIG. 14 illustrates a preferred embodiment of step 490, which marks vertices with torn edges due to edge E.

FIG. 14 illustrates a preferred embodiment of step 490, which marks vertices with torn edges due to edge E. Step 490 begins with decision step 700, which terminates step 490 if step 485 induced edges in the abstraction graph from base graph edge E. Otherwise, control passes to decision step 705, which dictates that if both vertex variable $G_1$ and vertex variable $G_2$ are vertices contained in the showing vertex set $V_{SHOW}$, then step 710 is performed and step 490 is terminated thereafter; otherwise, control passes to decision step 715. Step 710 marks vertices with torn edges when both ends show. (Step 710 is amplified in FIG. 15.) Step 715 dictates that if vertex variable $G_1$ is a vertex contained in the showing vertex set $V_{SHOW}$, then step 720 is performed and step 490 is terminated thereafter; otherwise, control passes to decision step 725. Step 720 marks vertices with torn edges when only the vertex indicated by vertex variable $G_1$ is showing. (Step 720 is amplified in FIG. 16.) Step 725 dictates that if vertex variable $G_2$ is a vertex contained in the showing vertex set $V_{SHOW}$ then step 730 is performed and step 490 is, terminated thereafter; otherwise, otherwise step 735 is performed and step 490 is terminated thereafter. Step 730 marks vertices with torn edges when only the vertex indicated by vertex variable $G_2$ is showing. (Step 730 is amplified in FIG. 17.) Step 735 marks vertices with torn edges when neither end is showing. (Step 735 is amplified in FIG. 18.)

Figure 15:
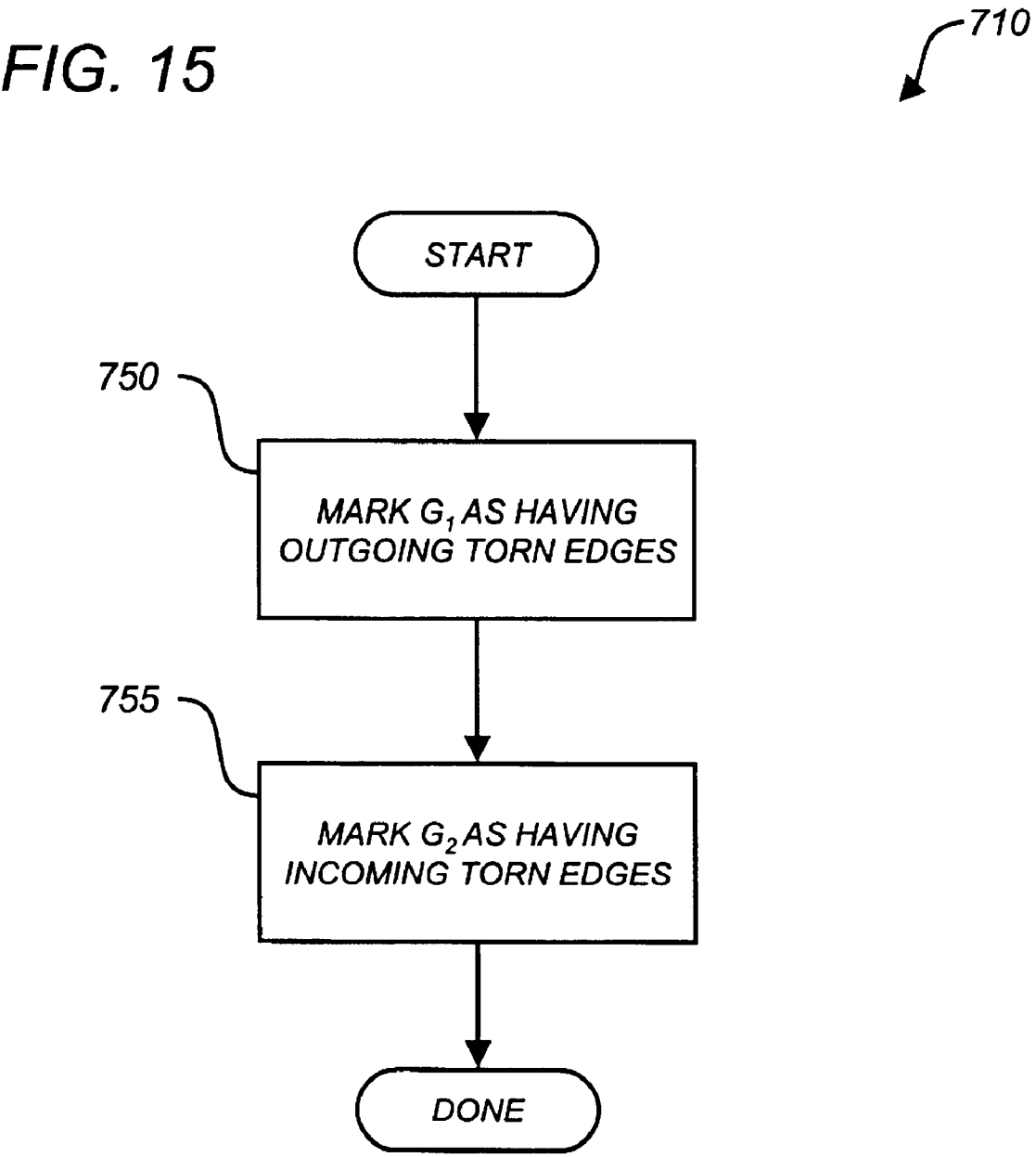
FIG. 15 is a drawing of a preferred embodiment of step 710, which marks vertices with torn edges when both end show.

FIG. 15 is a drawing of a preferred embodiment of step 710, which marks vertices with torn edges when both ends show, and consists of step 750 and 755, which may be carried out in any order. Step 750 marks the vertex indicated by vertex variable $G_1$ as having outgoing torn edges. Step 755 marks the vertex indicated by vertex variable $G_2$ as having incoming torn edges.

Figure 16:
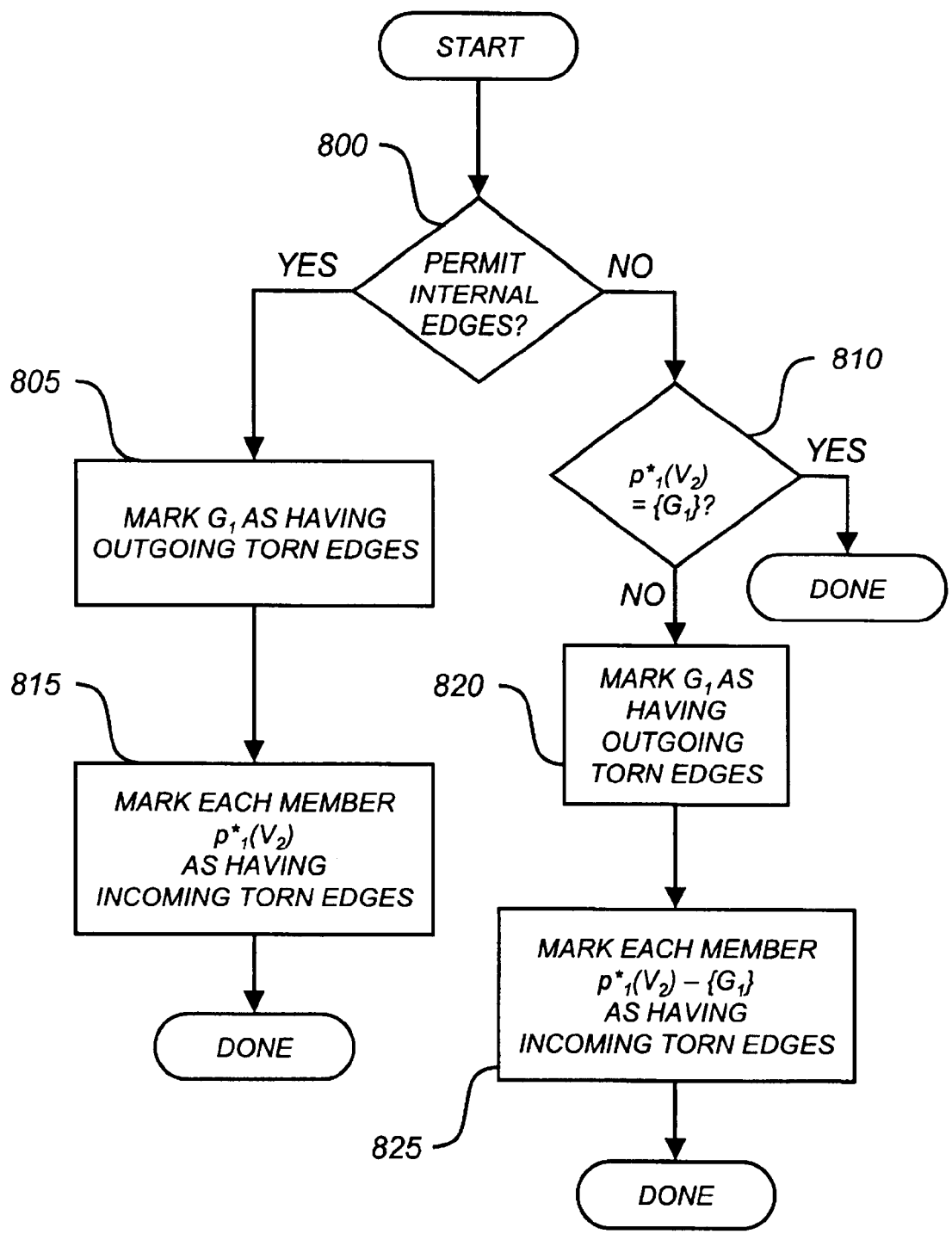
FIG. 16 shows a preferred embodiment of step 720, which marks vertices with torn edges when only the vertex indicated by vertex variable $G_1$ is showing.

FIG. 16 shows a preferred embodiment of step 720, which marks vertices with torn edges when only the vertex indicated by vertex variable $G_1$ is showing. The preferred embodiment begins with decision step 800, which dictates that if internal edges are permitted, step 805 will be performed; otherwise step 810 will be performed. Step 805 marks the vertex indicated by vertex variable $G_1$ as having outgoing torn edges. After performing step 805, step 815 is performed and step 700 is complete. Step 815 marks each member of the complete one-sided proxy function set, evaluated on the terminal vertex $V_2$, that is, each member of $p^*_1(V_2)$, as having incoming torn edges. Step 810 performs a decision, terminating step 700 if the complete one-sided proxy function set, evaluated on the terminal vertex $V_2$, that is, $p^*_1(V_2)$, contains only the single vertex indicated by vertex variable $G_1$. Otherwise, control is passed to step 820, which marks the vertex indicated by vertex variable $G_1$ as having outgoing torn edges. After performing step 820, step 825 is performed and step 700 is complete. Step 825 marks each member of the complete one-sided proxy function set, evaluated on the terminal vertex $V_2$, less the vertex indicated by vertex variable $G_1$ that is, each member of $p^*_1(V_2)-\{G_1\}$, as having incoming torn edges.

Figure 17:
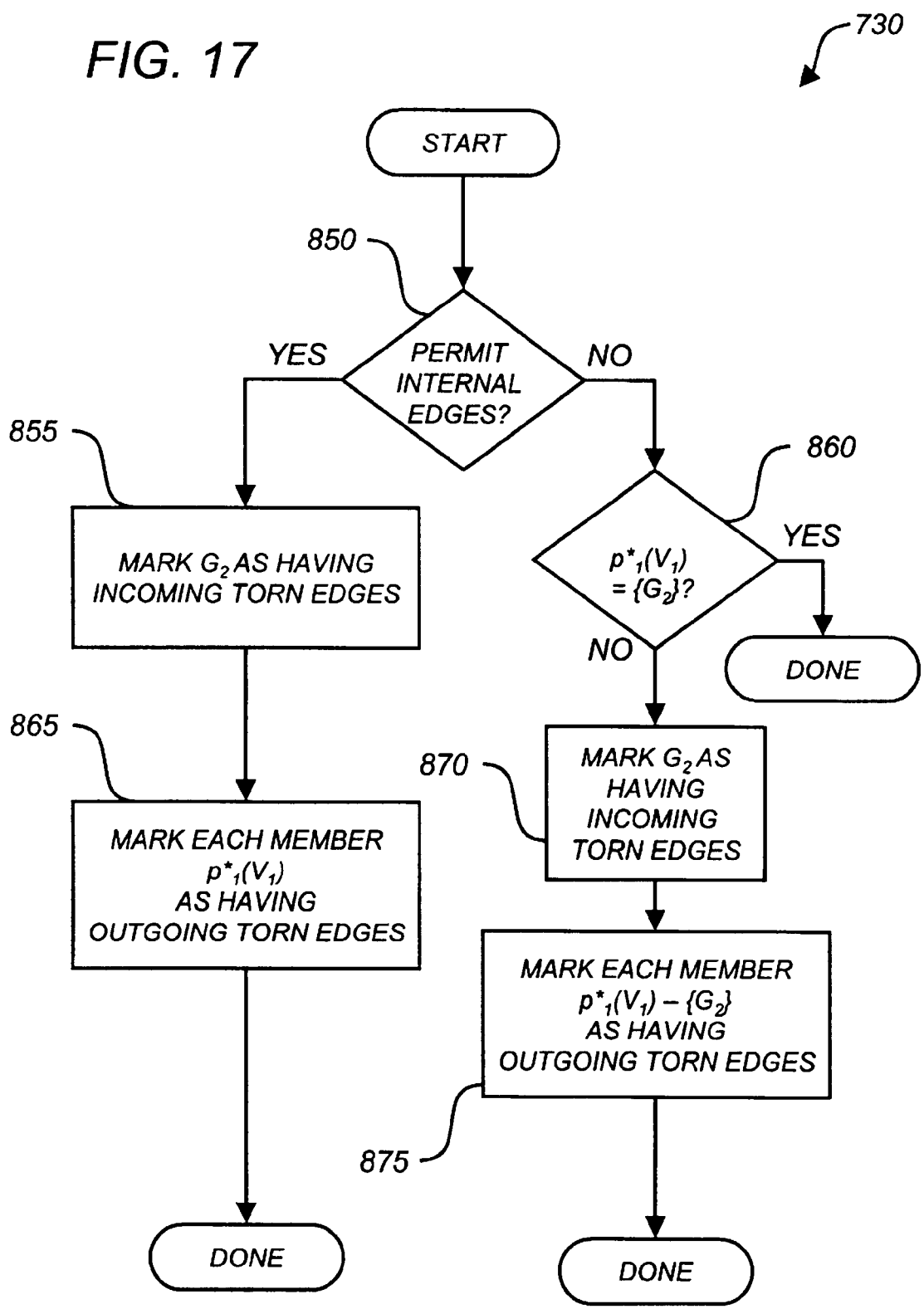
FIG. 17 shows a preferred embodiment of step 730, which marks vertices with torn edges when only the vertex indicated by vertex variable $G_2$ is showing.

FIG. 17 shows a preferred embodiment of step 730, which marks vertices with torn edges when only the vertex indicated by vertex variable $G_2$ is showing. The preferred embodiment begins with decision step 850, which dictates that if internal edges are permitted, step 855 will be performed; otherwise step 860 will be performed. Step 855 marks the vertex indicated by vertex variable $G_2$ as having incoming torn edges. After performing step 855, step 865 is performed and step 730 is complete. Step 865 marks each member of the complete one-sided proxy function set, evaluated on the initial vertex $V_1$, that is, each member of $p^*_1(V_1)$, as having outgoing torn edges. Step 860 performs a decision, terminating step 730 if the complete one-sided proxy function set, evaluated on the initial vertex $V_1$, that is, $p^*_1(V_1)$, contains only the single vertex indicated by vertex variable $G_2$. Otherwise, control is passed to step 870, which marks the vertex indicated by vertex variable $G_2$ as having incoming torn edges. After performing step 870, step 875 is performed and step 730 is complete. Step 875 marks each member of the complete one-sided proxy function set, evaluated on the initial vertex $V_1$, less the vertex indicated by vertex variable $G_2$, that is, each member of $p^*_1(V_1)-\{G_2\}$, as having outgoing torn edges.

Figure 18:
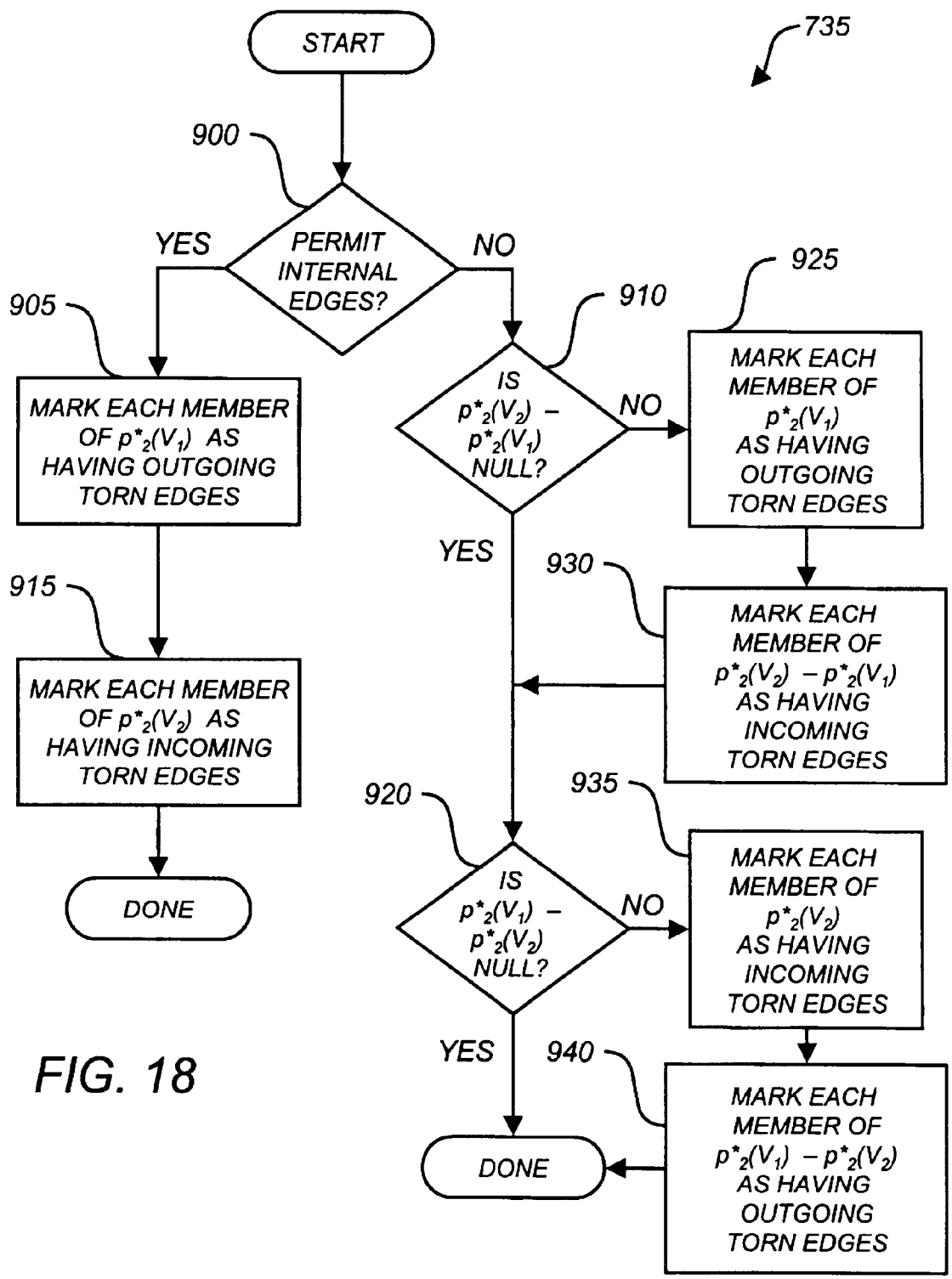
FIG. 18 shows a preferred embodiment of step 735, which marks vertices with torn edges when neither end is showing.

FIG. 18 shows a preferred embodiment of step 735, which marks vertices with torn edges when neither end is showing. The preferred embodiment begins with decision step 900, which dictates that if internal edges are permitted, step 905 will be performed; otherwise step 910 will be performed. Step 905 marks each member of the complete two-sided proxy function set, evaluated on the initial vertex $V_1$, that is, each member of $p^*_2(V_1)$, as having outgoing torn edges. After performing step 905, step 915 is performed and step 735 is complete. Step 915 marks each member of the complete two-sided proxy function set, evaluated on the terminal vertex $V_2$, that is, each member of $p^*_2(V_2)$, as having incoming torn edges. Step 910 performs a decision, skipping to step 920 if the complete two-sided proxy function set, evaluated on the terminal vertex $V_2$, less the complete two-sided proxy function set, evaluated on the initial vertex $V_2$ is null, that is, if $p^*_2(V_2)-p^*_2(V_1)$ is empty; otherwise, step 910 dictates that steps 925 and 930 be performed before proceeding to step 920. Step 925 marks each member of the complete two-sided proxy function set, evaluated on the initial vertex $V_1$, that is, each member of $p^*_2(V_1)$, as having outgoing torn edges. Step 930 marks each member of the complete two-sided proxy function set, evaluated on the terminal vertex $V_2$, less the complete two-sided proxy function set, evaluated on the initial vertex $V_1$, that is, each member of $p^*_2(V_2)-p^*_2(V_1)$, as having incoming torn edges. Step 920 performs a decision, terminating step 735 if the complete two-sided proxy function set, evaluated on the initial vertex $V_1$, less the complete two-sided proxy function set, evaluated on the terminal vertex $V_2$ is null, that is, if $p^*_2(V_1)-p^*_2(V_2)$ is empty; otherwise, step 920 dictates that steps 935 and 940 be performed before terminating step 735. Step 935 marks each member of the complete two-sided proxy function set, evaluated on the terminal vertex $V_2$, that is, each member of $p^*_2(V_2)$, as having incoming torn edges. Step 940 marks each member of the complete two-sided proxy function set, evaluated on the initial vertex $V_1$ less the complete two-sided proxy function set, evaluated on the terminal vertex $V_2$, that is, each member of $p^*_2(V_1)-p^*_2(V_2)$, as having outgoing torn edges.

Those skilled in the art will deem as obvious that many steps outlined hereinabove may be conducted in a different order than as presented, or conducted concurrently. In addition, is it obvious that simplifications may be made to address less general circumstances; such simplifications include using a single raw graph as the base graph, employing a single proxy function to serve as multiple proxy functions, and skipping steps when it is clear that they will not alter the result.

It is understood by those skilled in the art that my invention may take many forms differing from the embodiments described herein, and I intend that my invention be limited only by the appended claims and obvious variations thereof.

I claim:

1. A method for building an abstraction graph from a set of raw graphs in accordance with a composition graph, a visible vertices set, a hidden vertices set, a dispersed composite vertices set, and a hidden edge set, comprising the steps of:
   (a) building a base graph from said set of raw graphs;
   (b) computing a set of starting vertices consisting of a union of the visible vertices set and the set of source vertices of the composition graph, less the hidden vertices set;
   (c) determining a set of showing vertices by recording each vertex visited in a directed traversal on the composition graph from said set of starting vertices, said directed traversal excluding the members of the hidden vertices set, and said directed traversal excluding edges leaving vertices that are not members of the dispersed composite vertices set;
   (d) placing the members of said set of showing vertices in the abstraction graph as its vertices;
   (e) computing a set of proxy functions, each member of which maps each vertex in said base graph that is not in said set of showing vertices to a subset of the members of said set of showing vertices; and
   (f) inducing edges in the abstraction graph from edges in the base graph using said set of proxy functions to map adjacent vertices of edges in the base graph to vertices in the abstraction graph.

2. A method for building an abstraction graph from a set of raw graphs in accordance with a composition graph, a visible vertices set, a hidden vertices set, a dispersed composite vertices set, and a hidden edge set, according to claim 1, wherein
   (a) said step of computing a set of proxy functions includes the steps of:
      (i) computing an incomplete one-sided proxy set function $p_1$, to be used for proxies where one endpoint of an edge is showing, said incomplete one-sided proxy set function mapping each vertex v of said base graph, less those vertices in said set of showing vertices, to a set $p_1(v)$ of members of said set of showing vertices, said mapping in accord with the hidden vertices set;
      (ii) computing an incomplete two-sided proxy set function $p_2$, to be used for proxies where neither endpoint of an edge is showing, said incomplete two-sided proxy set function mapping each vertex v of said base graph, less those vertices in said set of showing vertices, to a set $p_2(v)$ of members of said set of showing vertices, said mapping in accord with the hidden vertices set;
      (iii) computing a complete one-sided proxy set function $p^*_1$, to be used for proxies where one endpoint of an edge is showing, said complete one-sided proxy set function mapping each vertex v of said base graph, less those vertices in said set of showing vertices, to a set $p^*_1(v)$ of members of said set of showing vertices, said mapping ignoring the hidden vertices set;
      (iv) computing a complete two-sided proxy set function $p^*_2$, to be used for proxies where neither endpoint of an edge is showing, said complete two-sided proxy set function mapping each vertex v of said base graph, less those vertices in said set of showing vertices, to a set $p^*_2(v)$ of members of said set of showing vertices, said mapping ignoring the hidden vertices set; and
   (b) said step of inducing edges in the abstraction graph from edges in the base graph includes the steps of:
      (i) for each edge E in said base graph, said edge E having an initial vertex $v_1$ and a terminal vertex $v_2$, processing said edge E, including the steps of:
         (A) computing vertex $g_1$, equal to the member of said set of showing vertices that initial vertex $v_1$ is a representative for in the composition graph, should one exist, and equal to initial vertex $v_1$, should said member of said set of showing vertices that initial vertex $v_1$ is a representative for in the composition graph not exist;
         (B) computing vertex $g_2$, equal to the member of said set of showing vertices that terminal vertex $v_2$ is a representative for in the composition graph, should one exist, and equal to terminal vertex $v_2$, should said member of said set of showing vertices that terminal vertex $v_2$ is a representative for in the composition graph not exist;
         (C) where said edge E is not a member of the hidden edge set and both said vertex $g_1$ and said vertex $g_2$ are members of said set of showing vertices, adding an edge from said vertex $g_1$ to said vertex $g_2$ in the abstraction graph;
         (D) where said edge E is not a member of the hidden edge set and said vertex $g_1$ is a member of said set of showing vertices and said vertex $g_2$ is not a member of said set of showing vertices, adding an edge from said vertex $g_1$ to each member of $p_1(v_2)-\{g_1\}$ in the abstraction graph;
         (E) where said edge E is not a member of the hidden edge set and said vertex $g_1$ is not a member of said set of showing vertices and said vertex $g_2$ is a member of said set of showing vertices, adding an edge from each member of $p_1(v_1)-\{g_2\}$ to said vertex $g_2$ in the abstraction graph; and
         (F) where said edge E is not a member of the hidden edge set and said vertex $g_1$ is not a member of said set of showing vertices and said vertex $g_2$ is not a member of said set of showing vertices, for each vertex c in $p_2(v_1)$ and each vertex d in $p_2(v_2)$, such that not both said vertex c and said vertex d are members of $p^*_2(v_1)$ and $p^*_2(v_2)$ add an edge from vertex c to vertex d in the abstraction graph.

3. A method for building an abstraction graph from a set of raw graphs in accordance with a composition graph, a visible vertices set, a hidden vertices set, a dispersed composite vertices set, and a hidden edge set, according to claim 2, wherein said step of processing said edge E further includes the step of marking vertices in the abstraction graph as having torn edges, where said edge E does not result in adding any edges to the abstraction graph.

4. A method for building an abstraction graph from a set of raw graphs in accordance with a composition graph, a visible vertices set, a hidden vertices set, a dispersed composite vertices set, and a hidden edge set, according to claim 3, wherein said step of marking vertices in the abstraction graph as having torn edges includes the steps of:

(i) where both said vertex $g_1$ and said vertex $g_2$ are members of said set of showing vertices, marking said vertex $g_1$ as having outgoing torn edges and marking said vertex $g_2$ as having incoming torn edges;

(ii) where said vertex $g_1$ is a member of said set of showing vertices and said vertex $g_2$ is not a member of said set of showing vertices, and in which the set $p^*_1(v_2)-\{g_1\}$ is nonempty, marking said vertex $g_1$ as having outgoing torn edges and marking all vertices in the set $p^*_1(v_2)-\{g_1\}$ as having incoming torn edges;

(iii) where said vertex $g_2$ is a member of said set of showing vertices and said vertex $g_1$ is not a member of said set of showing vertices, and in which the set $p^*_1(v_1)-\{g_2\}$ is nonempty, marking said vertex $g_2$ as having incoming torn edges and marking all vertices in the set $p^*_1(v_1)-\{g_2\}$ as having outgoing torn edges; and (iv) where neither said vertex $g_1$ nor said vertex $g_2$ is a member of said set of showing vertices, performing the steps of:

(A) where $p^*_2(v_2)-p^*_2(v_1)$ is nonempty, marking the vertices in the set $p^*_2(v_1)$ as having outgoing torn edges and marking vertices in the set $p^*_2(v_2)-p^*_2(v_1)$ as having incoming torn edges; and (B) where $p^*_2(v_1)-p^*_2(v_2)$ is nonempty, marking the vertices in the set $p^*_2(v_2)$ as having incoming torn edges and marking vertices in the set $p^*_2(v_1)-p^*_2(v_2)$ as having outgoing torn edges.

5. A method for building an abstraction graph from a raw graph in accordance with a composition graph, a visible vertices set, a hidden vertices set, a dispersed composite vertices set, and a hidden edge set, comprising the steps of:

(a) computing a set of starting vertices consisting of a union of the visible vertices set and the set of source vertices of the composition graph, less the hidden vertices set;

(b) determining a set of showing vertices by recording each vertex visited in a directed traversal on the composition graph from said set of starting vertices, said directed traversal excluding the members of the hidden vertices set, and said directed traversal excluding edges leaving vertices that are not members of the dispersed composite vertices set;

(c) placing the members of said set of showing vertices in the abstraction graph as its vertices;

(d) computing a set of proxy functions, each member of which maps each vertex in the raw graph that is not in said set of showing vertices to a subset of the members of said set of showing vertices; and (e) inducing edges in the abstraction graph from edges in the raw graph using said set of proxy functions to map adjacent vertices of edges in the raw graph to vertices in the abstraction graph.

6. A method for building an abstraction graph from a raw graph in accordance with a composition graph, a visible vertices set, a hidden vertices set, a dispersed composite vertices set, and a hidden edge set, according to claim 5, wherein (a) said step of computing a set of proxy functions includes the steps of:

(i) computing an incomplete one-sided proxy set function $p_1$, to be used for proxies where one endpoint of an edge is showing, said incomplete one-sided proxy set function mapping each vertex v of said raw graph, less those vertices in said set of showing vertices, to a set $p_1(v)$ of members of said set of showing vertices, said mapping in accord with the hidden vertices set;

(ii) computing an incomplete two-sided proxy set function $p_2$, to be used for proxies where neither endpoint of an edge is showing, said incomplete two-sided proxy set function mapping each vertex v of said raw graph, less those vertices in said set of showing vertices, to a set $p_2(v)$ of members of said set of showing vertices, said mapping in accord with the hidden vertices set;

(iii) computing a complete one-sided proxy set function $p^*_1$, to be used for proxies where one endpoint of an edge is showing, said complete one-sided proxy set function mapping each vertex v of said raw graph, less those vertices in said set of showing vertices, to a set $p^*_1(v)$ of members of said set of showing vertices, said mapping ignoring the hidden vertices set;

(iv) computing a complete two-sided proxy set function $p^*_2$, to be used for proxies where neither endpoint of an edge is showing, said complete two-sided proxy set function mapping each vertex v of said raw graph, less those vertices in said set of showing vertices, to a set $p^*_2(v)$ of members of said set of showing vertices, said mapping ignoring the hidden vertices set; and (b) said step of inducing edges in the abstraction graph from edges in the raw graph includes the steps of:

(i) for each edge E in said raw graph, said edge E having an initial vertex $v_1$ and a terminal vertex $v_2$, processing said edge E, including the steps of:

(A) computing vertex $g_1$, equal to the member of said set of showing vertices that initial vertex $v_1$ is a representative for in the composition graph, should one exist, and equal to initial vertex $v_1$, should said member of said set of showing vertices that initial vertex $v_1$ is a representative for in the composition graph not exist;

(B) computing vertex $g_2$, equal to the member of said set of showing vertices that terminal vertex $v_2$ is a representative for in the composition graph, should one exist, and equal to terminal vertex $v_2$, should said member of said set of showing vertices that terminal vertex $v_2$ is a representative for in the composition graph not exist;

(C) where said edge E is not a member of the hidden edge set and both said vertex $g_1$ and said vertex $g_2$ are members of said set of showing vertices, adding an edge from said vertex $g_1$ to said vertex $g_2$ in the abstraction graph;

(D) where said edge E is not a member of the hidden edge set and said vertex $g_1$ is a member of said set of showing vertices and said vertex $g_2$ is not a member of said set of showing vertices, adding an edge from said vertex $g_1$ to each member of $p_1(v_2)-\{g_1\}$ in the abstraction graph;

(E) where said edge E is not a member of the hidden edge set and said vertex $g_1$ is not a member of said set of showing vertices and said vertex $g_2$ is a member of said set of showing vertices, adding an edge from each member of $p_1(v_1)-\{g_2\}$ to said vertex $g_2$ in the abstraction graph; and (F) where said edge E is not a member of the hidden edge set and said vertex $g_1$ is not a member of said set of showing vertices and said vertex $g_2$ is not a member of said set of showing vertices, for each vertex c in $p_2(v_1)$ and each vertex d in $p_2(v_2)$ such that not both said vertex c and said vertex d are members of $p^*_2(v_1)$ and $p^*_2(v_2)$, add an edge from vertex c to vertex d in the abstraction graph.

7. A method for building an abstraction graph from a raw graph in accordance with a composition graph, a visible vertices set, a hidden vertices set, a dispersed composite vertices set, and a hidden edge set, according to claim 6, wherein said step of processing said edge E further includes the step of marking vertices in the abstraction graph as having torn edges, where said edge E does not result in adding any edges to the abstraction graph.

8. A method for building an abstraction graph from a raw graph in accordance with a composition graph, a visible vertices set, a hidden vertices set, a dispersed composite vertices set, and a hidden edge set, according to claim 7, wherein said step of marking vertices in the abstraction graph as having torn edges includes the steps of:
  (i) where both said vertex $g_1$ and said vertex $g_2$ are members of said set of showing vertices, marking said vertex $g_1$ as having outgoing torn edges and marking said vertex $g_2$ as having incoming torn edges;
  (ii) where said vertex $g_1$ is a member of said set of showing vertices and said vertex $g_2$ is not a member of said set of showing vertices, and in which the set $p^*_1(v_2)-\{g_1\}$ is nonempty, marking said vertex $g_1$ as having outgoing torn edges and marking all vertices in the set $p^*_1(v_2)-\{g_1\}$ as having incoming torn edges;
  (iii) where said vertex $g_2$ is a member of said set of showing vertices and said vertex $g_1$ is not a member of said set of showing vertices, and in which the set $p^*_1(v_1)-\{g_2\}$ is nonempty, marking said vertex $g_2$ as having incoming torn edges and marking all vertices in the set $p^*_1(v_1)-\{g_2\}$ as having outgoing torn edges; and
  (iv) where neither said vertex $g_1$ nor said vertex $g_2$ is a member of said set of showing vertices, performing the steps of:
   (A) where $p^*_2(v_2)-p^*_2(v_1)$ is nonempty, marking the vertices in the set $p^*_1(v_1)$ as having outgoing torn edges and marking vertices in the set $p^*_2(v_2)-p^*_2(v_1)$ as having incoming torn edges; and
   (B) where $p^*_2(v_1)-p^*_2(v_2)$ is nonempty, marking the vertices in the set $p^*_2(v_2)$ as having incoming torn edges and marking vertices in the set $p^*_2(v_1)-p^*_2(v_2)$ as having outgoing torn edges.

\* \* \* \* \*